United States Patent
Archer et al.

(10) Patent No.: US 9,606,824 B2
(45) Date of Patent: *Mar. 28, 2017

(54) ADMINISTERING VIRTUAL MACHINES IN A DISTRIBUTED COMPUTING ENVIRONMENT

(71) Applicant: International Business Machines Corporation, Armonk, NY (US)

(72) Inventors: Charles J. Archer, Hillsboro, OR (US); Michael A. Blocksome, Rochester, MN (US); James E. Carey, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/263,014

(22) Filed: Apr. 28, 2014

(65) Prior Publication Data

US 2015/0312326 A1 Oct. 29, 2015

Related U.S. Application Data

(63) Continuation of application No. 14/260,767, filed on Apr. 24, 2014.

(51) Int. Cl.
*G06F 15/173* (2006.01)
*G06F 9/455* (2006.01)
(Continued)

(52) U.S. Cl.
CPC ........ *G06F 9/45558* (2013.01); *G06F 9/5027* (2013.01); *H04L 41/12* (2013.01);
(Continued)

(58) Field of Classification Search
CPC .................. G06F 15/17318; G06F 9/5072
See application file for complete search history.

(56) References Cited

U.S. PATENT DOCUMENTS 8,191,063 B2 5/2012 Shingai
8,296,759 B1 10/2012 Hutchins
(Continued)

OTHER PUBLICATIONS

Appendix P; List of IBM Patent or Applications Treated as Related, Jan. 15, 2016, 2 pages.
(Continued)

*Primary Examiner* — Kevin Bates
*Assistant Examiner* — Dae Kim
(74) *Attorney, Agent, or Firm* — Brandon C. Kennedy; Feb Cabrasawan; Kennedy Lenart Spraggins LLP

(57) ABSTRACT

In a distributed computing environment that includes which each execute a VMM, where each VMM supports execution of one or more VMs, administering the VMs may include: assigning, by a VMM manager, the VMMs of the distributed computing environment to a logical tree topology, including assigning one of the VMMs as a root VMM of the tree topology; and executing, amongst the VMMs of the tree topology, a gather operation, including: sending, by the root VMM, to other VMMs in the tree topology, a request to retrieve one or more VMs supported by the other VMMs; pausing, by the other VMMs, each VM requested to be retrieved; and providing, by the other VMMs to the root VMM, the VMs requested to be retrieved.

9 Claims, 23 Drawing Sheets

(51) Int. Cl.
*G06F 9/50* (2006.01)
*H04L 29/08* (2006.01)
*H04L 12/24* (2006.01)

(52) U.S. Cl.
CPC .......... *H04L 41/5054* (2013.01); *H04L 67/10* (2013.01); *H04L 67/1014* (2013.01); *H04L 67/16* (2013.01); *G06F 2009/4557* (2013.01); *G06F 2009/45595* (2013.01)

(56) References Cited

U.S. PATENT DOCUMENTS

| | | | |
|---|---|---|---|
| 2005/0080934 A1 | 4/2005 | Cota-Robles | |
| 2007/0283348 A1 | 12/2007 | White | |
| 2009/0113426 A1 | 4/2009 | Mizuno | |
| 2009/0271775 A1 | 10/2009 | Barsness et al. | |
| 2009/0307703 A1 | 12/2009 | Archer et al. | |
| 2010/0145872 A1 | 6/2010 | Chae et al. | |
| 2010/0274997 A1* | 10/2010 | Archer | G06F 15/17318 712/225 |
| 2010/0306479 A1* | 12/2010 | Ezzat | G06F 15/167 711/147 |
| 2011/0067030 A1 | 3/2011 | Isard et al. | |
| 2011/0145471 A1* | 6/2011 | Corry | G06F 9/4856 711/6 |
| 2011/0270986 A1 | 11/2011 | Archer et al. | |
| 2013/0018935 A1 | 1/2013 | Archer et al. | |
| 2013/0018947 A1 | 1/2013 | Archer et al. | |
| 2013/0066938 A1 | 3/2013 | Archer et al. | |
| 2013/0067479 A1 | 3/2013 | Archer | |
| 2013/0081037 A1 | 3/2013 | Archer et al. | |
| 2013/0091335 A1* | 4/2013 | Mulcahy | G06F 11/2038 711/163 |
| 2013/0212145 A1 | 8/2013 | Archer et al. | |
| 2013/0212555 A1 | 8/2013 | Archer et al. | |
| 2013/0212558 A1 | 8/2013 | Archer et al. | |
| 2013/0212561 A1 | 8/2013 | Archer et al. | |
| 2013/0263118 A1* | 10/2013 | Kannan | G06F 9/45558 718/1 |
| 2013/0346978 A1 | 12/2013 | Jiang | |
| 2014/0006751 A1 | 1/2014 | Aliseychik | |
| 2014/0189682 A1 | 7/2014 | Crudele | |
| 2014/0196037 A1 | 7/2014 | Gopalan | |
| 2014/0325036 A1 | 10/2014 | Jahanbanifar et al. | |
| 2015/0149999 A1 | 5/2015 | Ramanathan | |
| 2015/0205672 A1 | 7/2015 | Bissett | |
| 2015/0309816 A1 | 10/2015 | Archer et al. | |
| 2015/0309817 A1 | 10/2015 | Archer et al. | |
| 2015/0309821 A1 | 10/2015 | Archer et al. | |
| 2015/0309822 A1 | 10/2015 | Archer et al. | |
| 2015/0309823 A1 | 10/2015 | Archer et al. | |
| 2015/0309824 A1 | 10/2015 | Archer et al. | |
| 2015/0312108 A1 | 10/2015 | Archer et al. | |
| 2015/0312109 A1 | 10/2015 | Archer et al. | |
| 2015/0312330 A1 | 10/2015 | Archer et al. | |
| 2015/0378604 A1 | 12/2015 | Kawakami et al. | |

OTHER PUBLICATIONS

Office Action, U.S. Appl. No. 14/260,710, Jun. 23, 2015, pp. 1-11.
Office Action, U.S. Appl. No. 14/261,874, Jun. 24, 2015, pp. 1-12.
Eckart et al. "Distributed Virtual Diskless Checkpointing: A Highly Fault Tolerant Scheme for Virtualized Clusters", Parallel and Distributed Processing Symposium Workshops & PhD Forum (IPDPSW), 2012 IEEE 26th International, May 21, 2012, pp. 1120-1127. IEEE [retrieved on Jun. 15, 2016]. Retrieved from: INSPEC. INSPEC Accession No. 12947823.
Wang et al. "In-Memory Checkpointing for MPI Programs by XOR-Based Double-Erasure Codes", in: Ropo et al., "Recent Advances in Parallel Virtual Machine and Messaging Passing Interface", vol. 5759 of the series Lecture Notes in Computer Science, Sep. 2009, pp. 84-93, Springer Berlin Heidelberg.

* cited by examiner

```
┌─────────────────────────────────────────────────────────────────────────┐
│ Assign, By A VMM Manager, The VMMs Of The Distributed Computing         │
│ Environment To A Logical Tree Topology, Including Assigning One Of The  │
│ VMMs As A Root VMM Of The Tree Topology                                 │
│ 1002                                                                    │
└─────────────────────────────────────────────────────────────────────────┘
                                    │
                                    ▼
┌─────────────────────────────────────────────────────────────────────────┐
│ Execute, Amongst The VMMs Of The Tree Topology, A Scatter Operation 1004│
│                                                                         │
│   ┌─────────────────────────────────────────────────────────────────┐   │
│   │ Execute A ScatterV Operation 1202                               │   │
│   │                                                                 │   │
│   │  ┌───────────────────────────────────────────────────────────┐  │   │
│   │  │ Pause, By The Root VMM One Or More Executing VMs 1006     │  │   │
│   │  └───────────────────────────────────────────────────────────┘  │   │
│   │                             │                                   │   │
│   │                             ▼                                   │   │
│   │  ┌───────────────────────────────────────────────────────────┐  │   │
│   │  │ Store, By The Root VMM In A Buffer, A Plurality Of VMs To │  │   │
│   │  │ Scatter Amongst The Other VMMs Of The Tree Topology 1008  │  │   │
│   │  └───────────────────────────────────────────────────────────┘  │   │
│   │                             │                                   │   │
│   │                             ▼                                   │   │
│   │  ┌───────────────────────────────────────────────────────────┐  │   │
│   │  │ Send, By The Root VMM, To Each Of The Other VMMs Of The   │  │   │
│   │  │ Tree Topology A Different One Of The VMs Stored In The    │  │   │
│   │  │ Buffer 1010                                               │  │   │
│   │  │  ┌─────────────────────────────────────────────────────┐  │  │   │
│   │  │  │ Send An Unequal Number Of VMs To At Least Two VMMs  │  │  │   │
│   │  │  │ 1204                                                │  │  │   │
│   │  │  └─────────────────────────────────────────────────────┘  │  │   │
│   │  └───────────────────────────────────────────────────────────┘  │   │
│   └─────────────────────────────────────────────────────────────────┘   │
└─────────────────────────────────────────────────────────────────────────┘
```

ADMINISTERING VIRTUAL MACHINES IN A DISTRIBUTED COMPUTING ENVIRONMENT

CROSS-REFERENCE TO RELATED APPLICATION

This application is a continuation application of and claims priority from U.S. patent application Ser. No. 14/260,767, filed on Apr. 24, 2014.

BACKGROUND OF THE INVENTION

Field of the Invention

The field of the invention is data processing, or, more specifically, methods, apparatus, and products for administering a plurality of virtual machines ('VMs') in a distributed computing environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Distributed computing environments today often share and pool resources of many computers so that efficient utilization of resources may be effected in order to execute various workloads. In such distributed computing environments many virtual machines are often instantiated to execute workloads. Such VMs, however, from time to time require management—relocation to other hardware hosts, duplication on other hardware hosts, failover, checkpointing, and so on. Techniques to effect such management operations at the present, however, lack efficiency and are often time consuming and tedious for a user to carry out. As the number and size of VMs in distributed computing environments increases with the size of the distributed computing environment itself, the inefficiencies of such management techniques also increase.

SUMMARY OF THE INVENTION

Methods, apparatus, and products for administering VMs in a distributed computing environment are disclosed in this specification. Such a distributed computing environment may include a plurality of hosts, with one or more of the hosts executing a virtual machine monitor ('VMM'). Each VMM may support execution of one or more VMs. In such an embodiment administering VMs may include assigning, by a VMM manager, the VMMs of the distributed computing environment to a logical tree topology, including assigning one of the VMMs as a root VMM of the tree topology.

Once assigned to a logical tree topology, administering VMs may include a executing a variety of different collective operations. In some examples, administering VMs may include executing, amongst the VMMs of the tree topology, a broadcast operation, including: pausing, by the root VMM, execution of one or more VMs supported by the root VMM; sending, by the root VMM, to other VMMs in the tree topology, a message indicating a pending transfer of the paused VMs; and transferring the paused VMs from the root VMM to the other VMMs.

In other examples, administering VMs may include executing, amongst the VMMs of the tree topology, a scatter operation, including: pausing, by the root VMM one or more executing VMs; storing, by the root VMM in a buffer, a plurality of VMs to scatter amongst the other VMMs of the tree topology; and sending, by the root VMM, to each of the other VMMs of the tree topology a different one of the VMs stored in the buffer.

In yet other examples, administering VMs may include executing, amongst the VMMs of the tree topology, a gather operation, including: sending, by the root VMM, to other VMMs in the tree topology, a request to retrieve one or more VMs supported by the other VMMs; pausing, by the other VMMs, each VM requested to be retrieved; and providing, by the other VMMs to the root VMM, the VMs requested to be retrieved.

In yet other examples, administering VMs may include executing, amongst the VMMs of the tree topology, an allgather operation, including: sending, by the root VMM, to other VMMs in the tree topology, a request to retrieve VMs supported by the other VMMs; pausing, by each of the other VMMs, a VM supported by the VMM; providing, by each of the other VMMs as a response to the root VMM's request, the paused VM; and broadcasting, by the root VM to the other VMMs as a set of VMs, the received VMs.

In other examples, administering VMs may include executing, by the VMMs of the tree topology, a reduce operation, including: sending, by the root VMM to each of other VMMs of the tree topology, a request for an instance of a particular VM; pausing, by each of the other VMMs, the requested instance of the particular VM; providing, by each of the other VMMs to the root VMM in response to the root VMM's request, the requested instance of the particular VM; and identifying, by the root VMM, differences among the requested instances of the particular VM including, performing a bitwise XOR operation amongst the instances of the particular VM.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 12 sets forth a flow chart illustrating an example method for administering VMs in a distributed computing environment utilizing a collective scattery operation according to embodiments of the present invention.

DETAILED DESCRIPTION OF EXEMPLARY EMBODIMENTS

Exemplary methods, apparatus, and products for administering VMs in a distributed computing environment in accordance with the present invention are described with reference to the accompanying drawings, beginning with FIG. 1. A distributed computing environment, as the term is used in this specification, refers to a software and hardware system in which components located on networked computers communicate and coordinate actions with one another by passing messages. The components interact with each other in order to achieve a common goal. Three significant characteristics of distributed computing environments are: concurrency of components, lack of a global clock, and independent failure of components.

Figure 1:
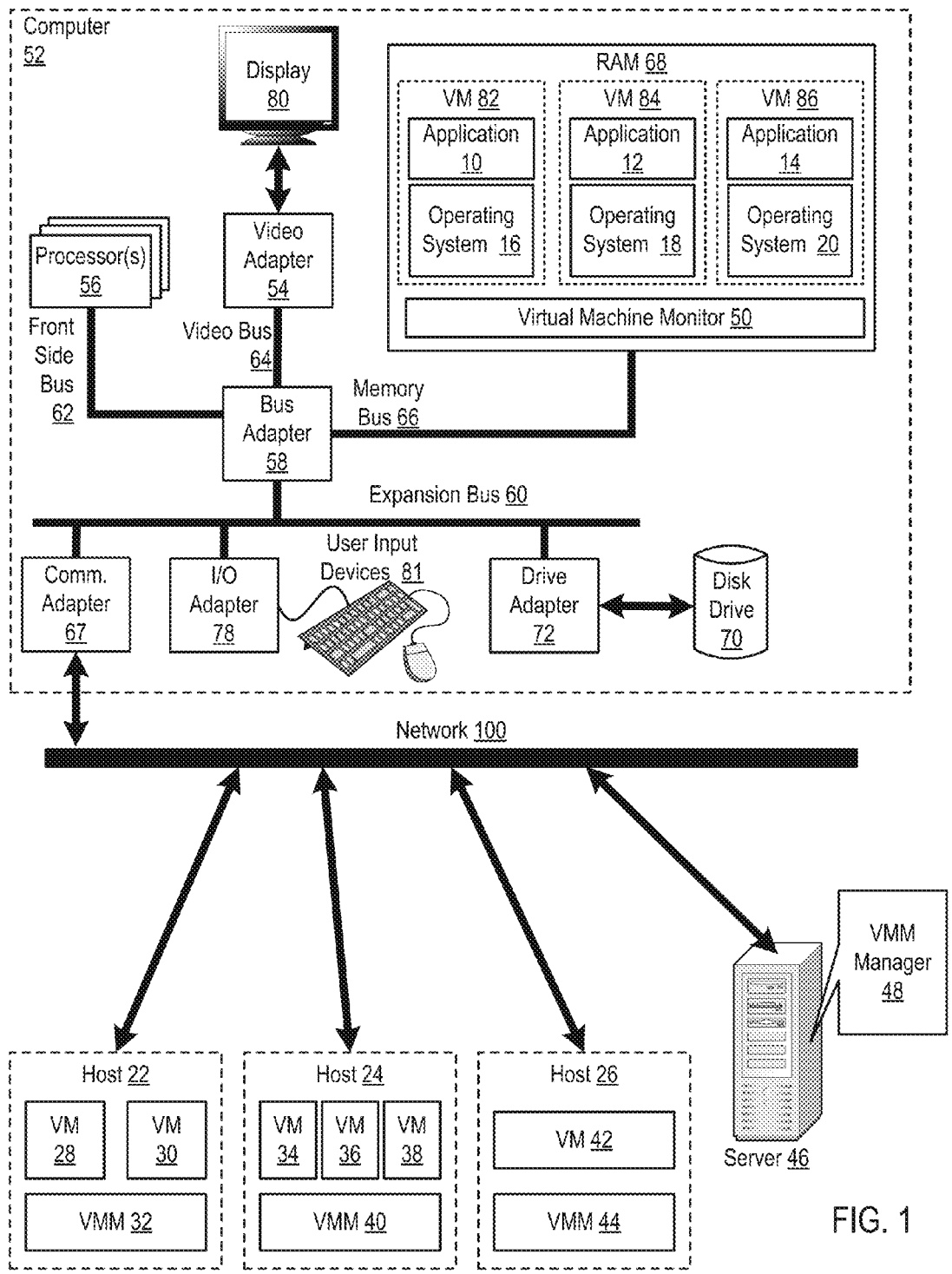
FIG. 1 illustrates an exemplary distributed computing environment for administering VMs according to embodiments of the present invention.

To that end, FIG. 1 sets forth a network diagram of a system for administering VMs in a distributed computing environment according to embodiments of the present invention. The system of FIG. 1 includes automated computing machinery in the form of an exemplary computer (52) useful for administering VMs in a distributed computing environment according to embodiments of the present invention. The computer (52) of FIG. 1 includes at least one computer processor (56) or 'CPU' as well as random access memory (68) ('RAM') which is connected through a high speed memory bus (66) and bus adapter (58) to processor (56) and to other components of the computer (52).

Stored in RAM (68) is a virtual machine monitor ('VMM')(50), sometimes referred to as a 'hypervisor.' The VMM (50) in the example of FIG. 1 is a module of computer program instructions that when executed by the processor (56) causes the computer (52) to support (or 'run') one or more virtual machines (82, 84, 86). The computer upon which the VMM (50) supports VMs is referred to as a host computer. In addition to the computer (52), the example of FIG. 1 also includes other hosts (22, 24, 26). Each of the hosts executes a separate VMM (32, 40, 44). Each VMM (32, 40, 44) supports a different number of VMs (28, 30, 34, 36, 38, 42).

A virtual machine, as the term is used in this specification, is a logical partition of host machine resources such that the virtual machine is a simulation of a stand-alone, independent computer. Physical characteristics of a computing platform—computer processors, computer memory, I/O adapters, and the like—are abstracted from the perspective of an operating system and other software applications that execute within the virtual machine.

Each virtual machine (82, 84, 86) executed in the computer (52) of FIG. 1 may support a separate operating system (16, 18, 20) and one or more applications (10, 12, 14). Operating systems useful in computers configured for administering VMs in a distributed computing environment according to embodiments of the present invention include UNIX™, Linux™ Microsoft XP™ AIX™ IBM's i5/OS™ and others as will occur to those of skill in the art. The operating systems (16, 18, 20), the VMs (82, 84, 86), and the VMM (50) in the example of FIG. 1 are shown in RAM (68), but many components of such software typically are stored in non-volatile memory also, such as, for example, on a disk drive (70).

The computer (52) of FIG. 1 includes disk drive adapter (72) coupled through expansion bus (60) and bus adapter (58) to processor (56) and other components of the computer (52). Disk drive adapter (72) connects non-volatile data storage to the computer (52) in the form of disk drive (70). Disk drive adapters useful in computers configured for administering VMs in a distributed computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (52) of FIG. 1 includes one or more input/output ('I/O') adapters (78). I/O adapters implement user-oriented input/output through, for example, software drivers and computer hardware for controlling output to display devices such as computer display screens, as well as user input from user input devices (81) such as keyboards and mice. The example computer (52) of FIG. 1 includes a video adapter (54), which is an example of an I/O adapter specially designed for graphic output to a display device (80) such as a display screen or computer monitor. Video adapter (54) is connected to processor (56) through a high speed video bus (64), bus adapter (58), and the front side bus (62), which is also a high speed bus.

The exemplary computer (52) of FIG. 1 includes a communications adapter (67) for data communications with other computers (22, 24, 26) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for administering VMs in a distributed computing environment according to embodiments of the present invention include modems for wired dial-up communications, Ethernet (IEEE 802.3) adapters for wired data communications, and 802.11 adapters for wireless data communications.

In the example of FIG. 1, a server (46) executes a virtual machine monitor manager (48). The VMM manager of FIG. 1 is a module of automated computing machinery comprising computer hardware and software that is configured to manage the VMMs in the example of FIG. 1. Such management may include orchestrating virtual machine migration, failover, checkpointing, duplication, creation, deletion, edits, and deployment. Other management operations may include workload distribution among VMMs, collection, analysis and reporting of execution statistics and energy consumption, software and operating system update management, system health monitoring, discovery of resources in the distributed computing systems available for use by VMs, and so on. Such VMM managers may also provide a user, such as a system administrator, direct control of such management operations.

The example VMM manager (48) in may be configured to carry out VM management in the distributed computing environment of FIG. 1 in various ways. Initially, the VMM manager (48) may assign the VMMs (50, 32, 40, 44) of the distributed computing environment to a logical tree topology. A tree topology may include one root node logically coupled to one or more child nodes. Those child nodes may, in turn, be logically coupled to one or more child nodes. Each node may be logically coupled to any number of nodes. In a binary tree topology, for example, each node (except those nodes at the 'bottom' of the tree) may be logically coupled to child nodes. In other tree topologies, such as high radix tree topologies, each node may be logically coupled to many child nodes. In assigning the VMMs of to a logical tree topology, the VMM manager (48) may also assign one of the VMMs as a root VMM of the tree topology.

Once assigned to the tree topology, the VMMs (50, 32, 40, 44) may execute a number of different collective operations amongst the VMMs to effect management operations of VMs supported by the VMMs. In some embodiments, the VMMs may execute a broadcast operation by: pausing, by the root VMM, execution of one or more VMs supported by the root VMM; sending, by the root VMM, to other VMMs in the tree topology, a message indicating a pending transfer of the paused VMs; and transferring the paused VMs from the root VMM to the other VMMs. Additional explanation of such a collective broadcast operation is set forth below with respect to FIGS. 8 and 9.

In other embodiments, the VMMs may execute a scatter operation by: pausing, by the root VMM one or more executing VMs; and storing, by the root VMM in a buffer, a plurality of VMs to scatter amongst the other VMMs of the tree topology; and sending, by the root VMM, to each of the other VMMs of the tree topology a different one of the VMs stored in the buffer. One type of a scatter operation is a scattery operation, and, in such examples, sending the VMs stored in the buffer to the other VMMs may include sending an unequal number of VMs to at least two VMMs. Additional explanation of scatter operations carried out by VMMs in accordance with embodiments of the present invention is set forth below with respect to FIGS. 10 and 11, and additional explanation of scattery operations is set forth below with respect to FIGS. 12 and 13.

In other embodiments, the VMMs may execute a gather operation by: sending, by the root VMM, to other VMMs in the tree topology, a request to retrieve one or more VMs supported by the other VMMs; pausing, by the other VMMs, each VM requested to be retrieved; and providing, by the other VMMs to the root VMM, the VMs requested to be retrieved. One type of gather operation is a gather operation and, in such examples, providing the VMs requested to be retrieved may include providing, by at least one of the other VMMs, a different number of VMs than another of the other VMMs. Additional explanation of such gather operations is set forth below with respect to FIGS. 14 and 15 and additional explanation of gatherv operations is set forth below with respect to FIGS. 16 and 17.

In other embodiments, the VMMs may execute an allgather operation by: sending, by the root VMM, to other VMMs in the tree topology, a request to retrieve VMs supported by the other VMMs; pausing, by each of the other VMMs, a VM supported by the VMM; providing, by each of the other VMMs as a response to the root VMM's request, the paused VM; broadcasting, by the root VM to the other VMMs as a set of VMs, the received VMs. Additional explanation of such an allgather operation is set forth below with respect to FIGS. 18, 19, and 20.

In yet other embodiments, the VMMs may execute a reduce operation by: sending, by the root VMM to each of other VMMs of the tree topology, a request for an instance of a particular VM; pausing, by each of the other VMMs, the requested instance of the particular VM; providing, by each of the other VMMs to the root VMM in response to the root VMM's request, the requested instance of the particular VM; and identifying, by the root VMM, differences among the requested instances of the particular VM including, performing a bitwise XOR operation amongst the instances of the particular VM. Additional explanation of such a reduce operation is set forth below with respect to FIGS. 21, 22, and 23.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

One type of distributing computing environment in which VMs may be administered according to embodiments of the present invention includes a parallel computer. Parallel computing refers to the simultaneous execution of a task (split up and specially adapted) on multiple processors or multiple hardware threads to obtain results faster than serially processing the task multiple times. Parallel computing is based on the fact that the process of solving a problem usually can be divided into smaller tasks, which may be carried out simultaneously with some coordination. Parallel computers execute parallel algorithms or 'parallel processes'. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together.

In this specification, the multiple processing devices that execute the individual pieces of a parallel program are referred to as 'compute nodes.' A parallel computer may be composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

In some parallel computers, each compute node may execute one or more parallel processes. Each parallel process may be referred to in a variety of ways depending on context including, for example, as a task, and endpoint, or a rank. In some embodiments, a single task may include multiple endpoints, where each endpoint is a data communications endpoint that supports communications among many other endpoints. In such an embodiment a parallel process may be referred to as a single task or alternatively as a single endpoint of a task. In some other embodiments, each compute node may execute a single task that operates as a single data communications endpoint. For example, a parallel computer that operates in accordance with the Message Passing Interface ('MPI') standard, described below in more detail, may execute a single rank on each compute node of the parallel computer. In such implementations, a parallel process may be referred to as a rank. Also in such embodiments, the term task, endpoint, and rank may be effectively synonymous.

Figure 2:
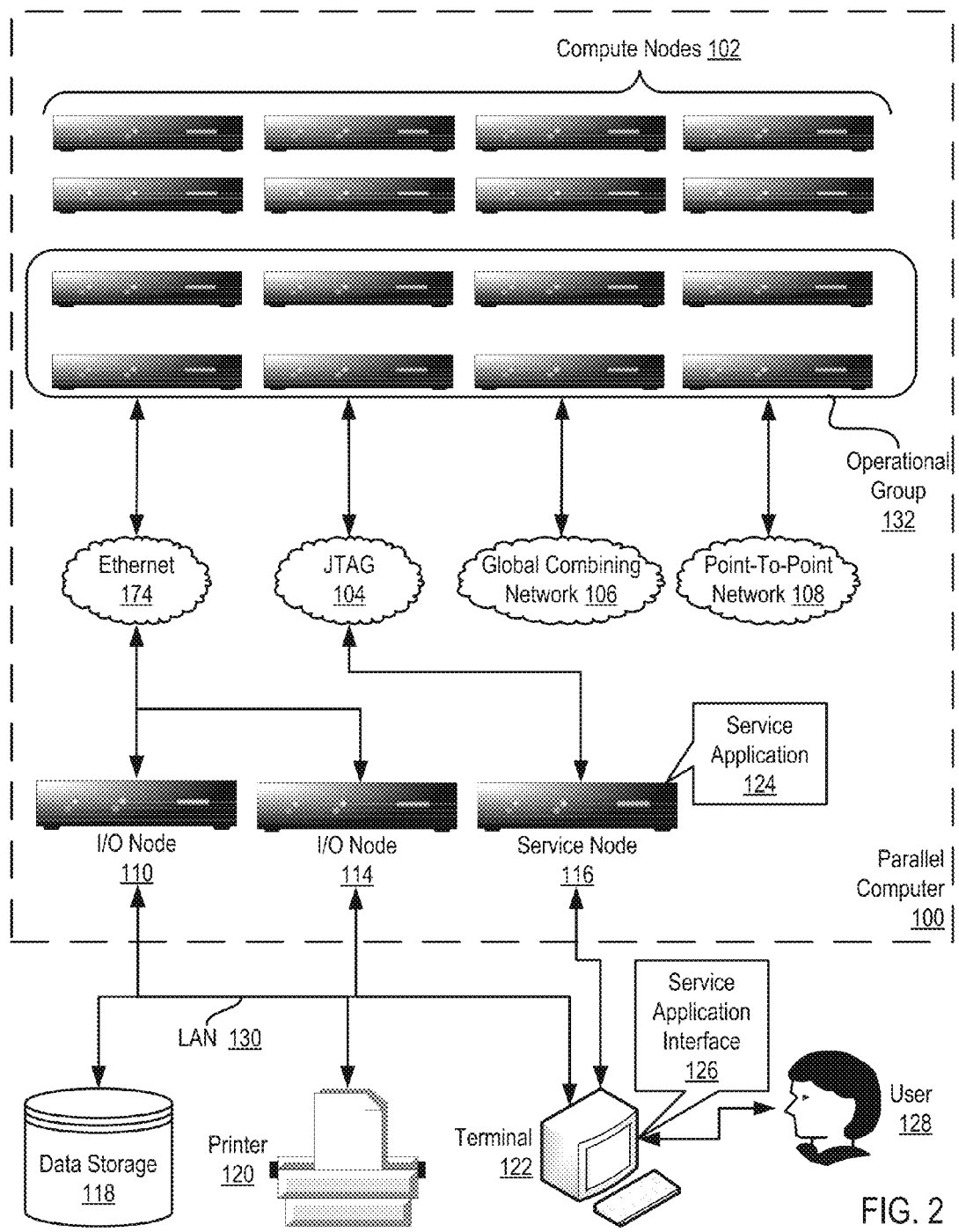
FIG. 2 illustrates an exemplary system for administering VMs in a distributed computing environment according to embodiments of the present invention.

For further explanation, FIG. 2 illustrates an exemplary system for administering VMs in a distributed computing environment according to embodiments of the present invention. The system of FIG. 2 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 2 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 2, the I/O nodes (110, 114) are connected for data communications I/O devices (118, 120, 122) through local area network ('LAN') (130) implemented using high-speed Ethernet.

The parallel computer (100) of FIG. 2 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 2 operates generally for administering VMs in a distributed computing environment in accordance with embodiments of the present invention. One of the compute nodes in the example of FIG. 2 may execute a VMM manager and a plurality of the compute nodes (102) may execute a VMM that supports execution of one or more VMs. Consider, for example, that each compute node of the operational group (132) executes a single VMM and one or more VMs. In such an example, the VMM manager may assign the VMMs of the distributed computing environment (the compute nodes) to a logical tree topology. The VMM manager may assign one of the VMMs as a root VMM of the tree topology.

Once organized into the tree topology, the VMMs may execute one or more collective operations to manage the VMs. Such collective operations may include: a broadcast operation, a scatter operation, a scattery operation, a gather operation, a gatherv operation, an allgather operation, or a reduce operation. With these collective operations, the VMMs may effectively manage migration, duplication, checkpointing, and the like of VMs executing on compute nodes (102) of the operational group (132).

Administering VMs in a distributed computing environment according to embodiments of the present invention may generally be implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 3 sets forth a block diagram of an example compute node (102) useful in a parallel computer capable of administering VMs in a distributed computing environment according to embodiments of the present invention. The compute node (102) of FIG. 3 includes a plurality of processing cores (165) as well as RAM (156). The processing cores (165) of FIG. 3 may be configured on one or more integrated circuit dies. Processing cores (165) are connected to RAM (156) through a high-speed memory bus (155) and through a bus adapter (194) and an extension bus (168) to other components of the compute node.

Stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 3:
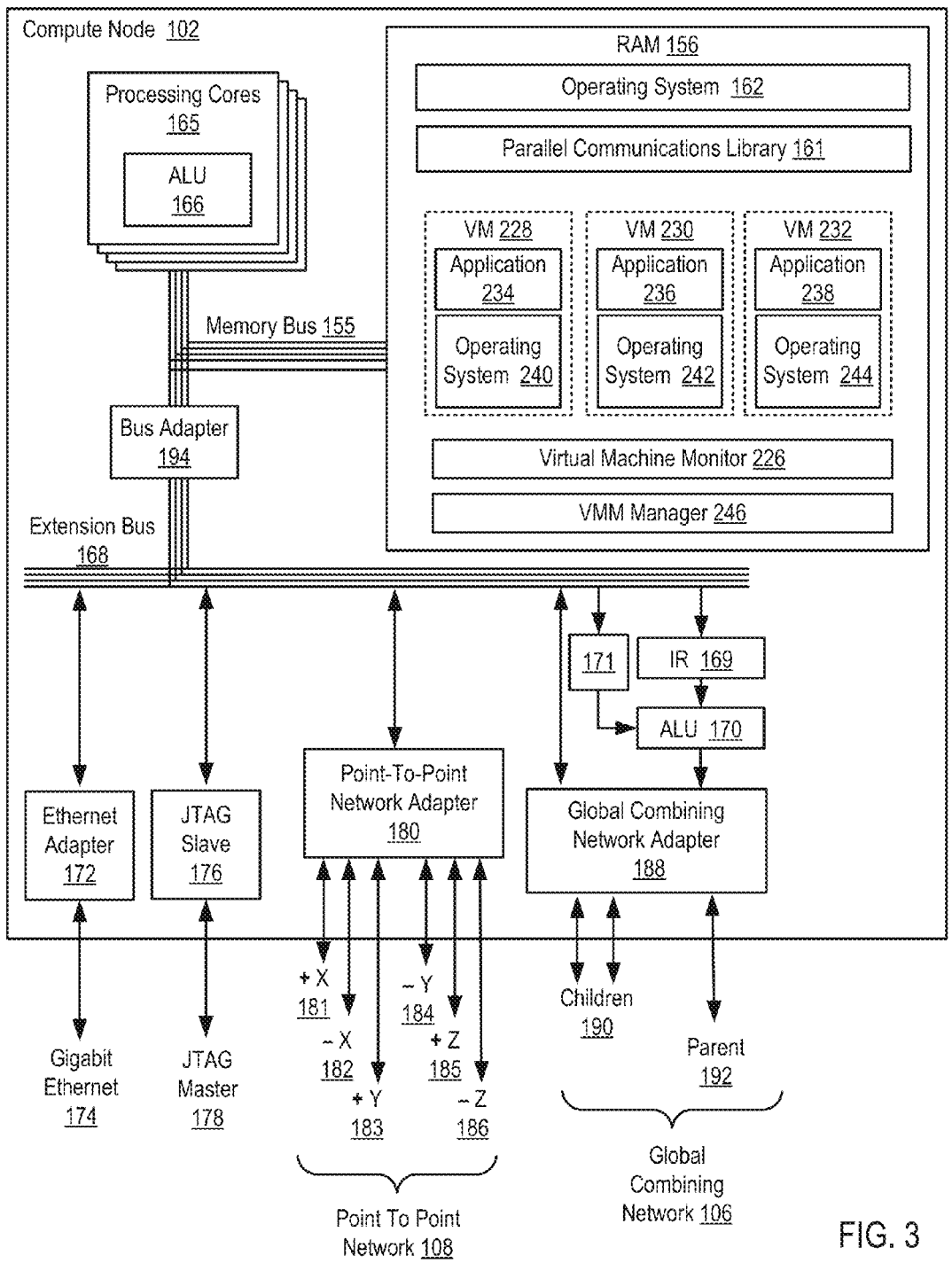
FIG. 3 sets forth a block diagram of an example compute node useful in a parallel computer capable of administering VMs in a distributed computing environment according to embodiments of the present invention.

Also stored in RAM (156) of the example compute node (102) of FIG. 3 is a VMM (226) that supports execution of several VMs (228, 230, 232). Each of the VMs executes an application (234, 236, 238) and an operating system (240, 242, 244). Readers of skill in the art will recognize that each VM may be provisioned as identical and separate instances of a single virtual machine or be provisioned with different resources in both kind and amount. Further, the application and operating system executing in one VM may be a second instance of the same application and operating system executing in another VM or may be a different application or different operating system.

Also stored in RAM (156) of the example compute node (102) is a VMM manager (248). Such a VMM manager is depicted in the example of FIG. 3 as being executed in a compute node that also includes a VMM for ease of explanation. Readers of skill in the art will recognize, however, that in other embodiments the VMM manager (246) may execute on a server or node separate from the compute nodes (the hosts) upon which VMMs support execution of VMs.

The VMM manager (246) in the example of FIG. 3 may be configured for administration of VMs in the parallel computer in accordance with embodiments of the present invention. The VMM manager (246) in the example of FIG. 3 may assign the VMMs of the parallel computer—VMM (226) executing on compute node (102) and other compute nodes not shown in FIG. 3—to a logical tree topology, with one of the VMMs assigned as a root VMM of the tree topology.

Once assigned to a tree topology the VMMs may carry out a number of VM administration operations through use of collective operations. The VMMs, for example, may execute any one of a broadcast operation, a scatter operation, a scattery operation, a gather operation, a gatherv operation, an allgather operation, or a reduce operation to effect any of VM migration, VM checkpointing, VM duplication, VM failover, and so on.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 3, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 3 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for administering VMs in a distributed computing environment include modems for wired communications, Ethernet (IEEE 802.3) adapters for wired network communications, and 802.11b adapters for wireless network communications.

The data communications adapters in the example of FIG. 3 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 3 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 3 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for administering VMs in a distributed computing environment to embodiments of the present invention.

The data communications adapters in the example of FIG. 3 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 3 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 3, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 4:
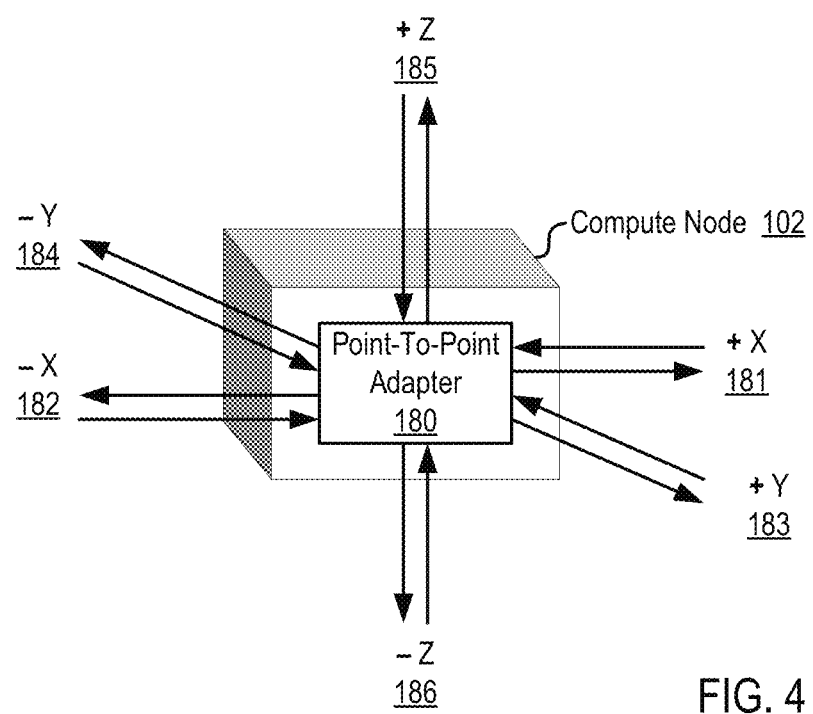
FIG. 4 sets forth a block diagram of an example Point-To-Point Adapter useful in systems for administering VMs in a distributed computing environment according to embodiments of the present invention.

For further explanation, FIG. 4 sets forth a block diagram of an example Point-To-Point Adapter (180) useful in systems for administering VMs in a distributed computing environment according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 4 provides data communication along an x-axis through four unidirectional data communications links, to and from the next node in the −x direction (182) and to and from the next node in the +x direction (181). The Point-To-Point Adapter (180) of FIG. 4 also provides data communication along a y-axis through four unidirectional data communications links, to and from the next node in the −y direction (184) and to and from the next node in the +y direction (183). The Point-To-Point Adapter (180) of FIG. 4 also provides data communication along a z-axis through four unidirectional data communications links, to and from the next node in the −z direction (186) and to and from the next node in the +z direction (185).

Figure 5:
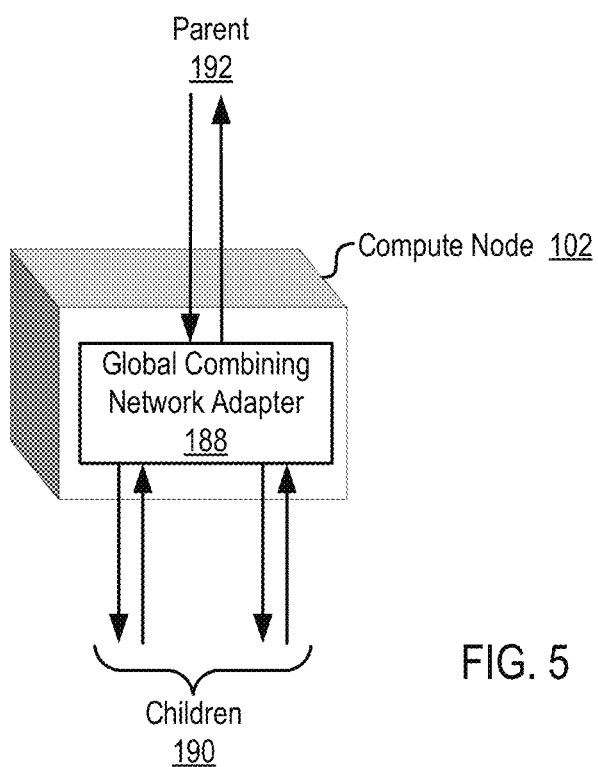
FIG. 5 sets forth a block diagram of an example Global Combining Network Adapter useful in systems for administering VMs in a distributed computing environment according to embodiments of the present invention.

For further explanation, FIG. 5 sets forth a block diagram of an example Global Combining Network Adapter (188) useful in systems for administering VMs in a distributed computing environment according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 5 provides data communication to and from children nodes of a global combining network through four unidirectional data communications links (190), and also provides data communication to and from a parent node of the global combining network through two unidirectional data communications links (192).

Figure 6:
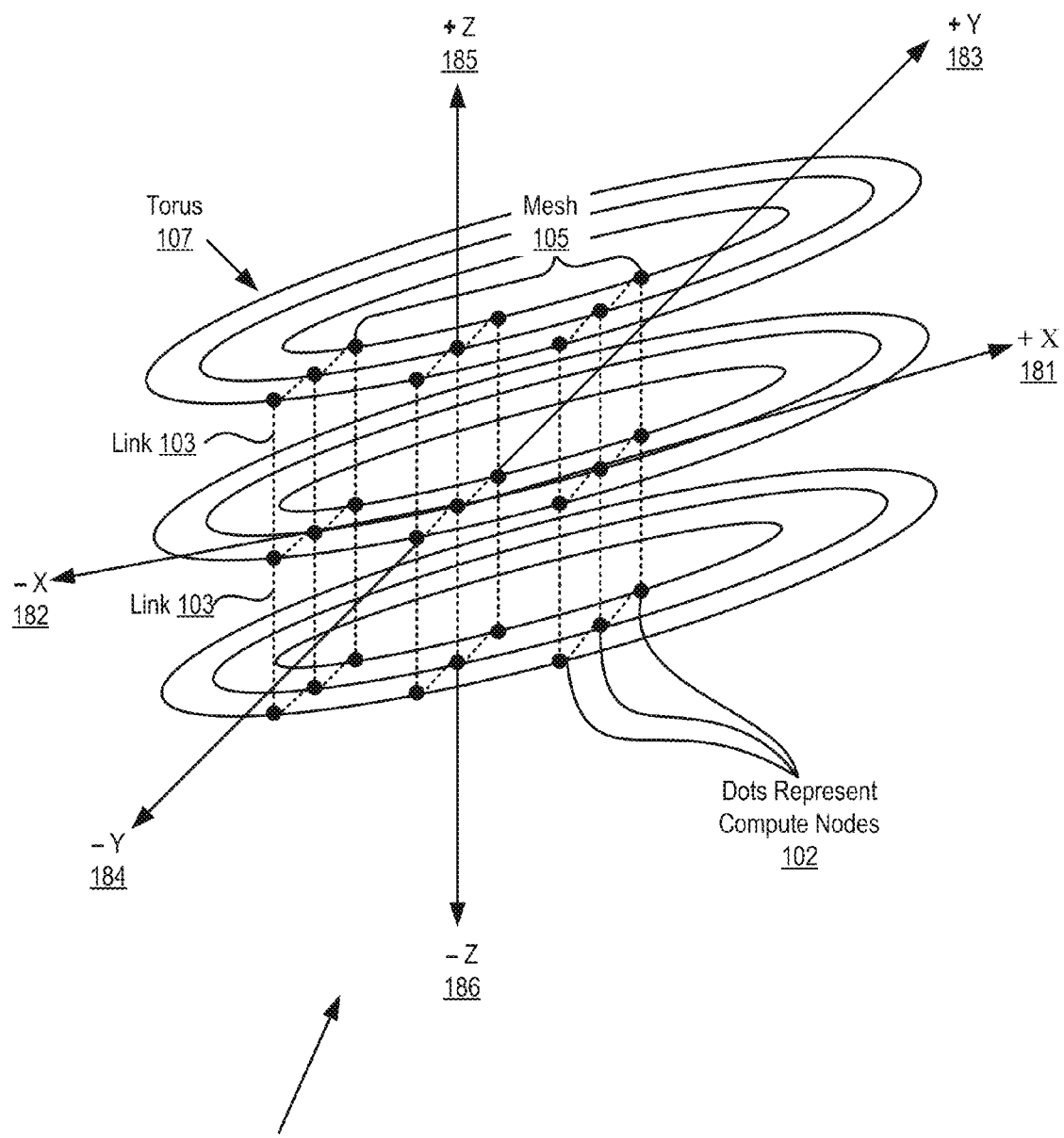
FIG. 6 sets forth a line drawing illustrating an example data communications network optimized for point-to-point operations useful in systems capable of administering VMs in a distributed computing environment according to embodiments of the present invention.

For further explanation, FIG. 6 sets forth a line drawing illustrating an example data communications network (108) optimized for point-to-point operations useful in systems capable of administering VMs in a distributed computing environment according to embodiments of the present invention. In the example of FIG. 6, dots represent compute nodes (102) of a parallel computer, and the dotted lines between the dots represent data communications links (103) between compute nodes. The data communications links are implemented with point-to-point data communications adapters similar to the one illustrated for example in FIG. 4, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 6 is illustrated with only 27 compute nodes, but readers will recognize that a data communications network optimized for point-to-point operations for use in administering VMs in a distributed computing environment in accordance with embodiments of the present invention may contain only a few compute nodes or may contain thousands of compute nodes. For ease of explanation, the data communications network of FIG. 6 is illustrated with only three dimensions, but readers will recognize that a data communications network optimized for point-to-point operations for use in administering VMs in a distributed computing environment in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 7:
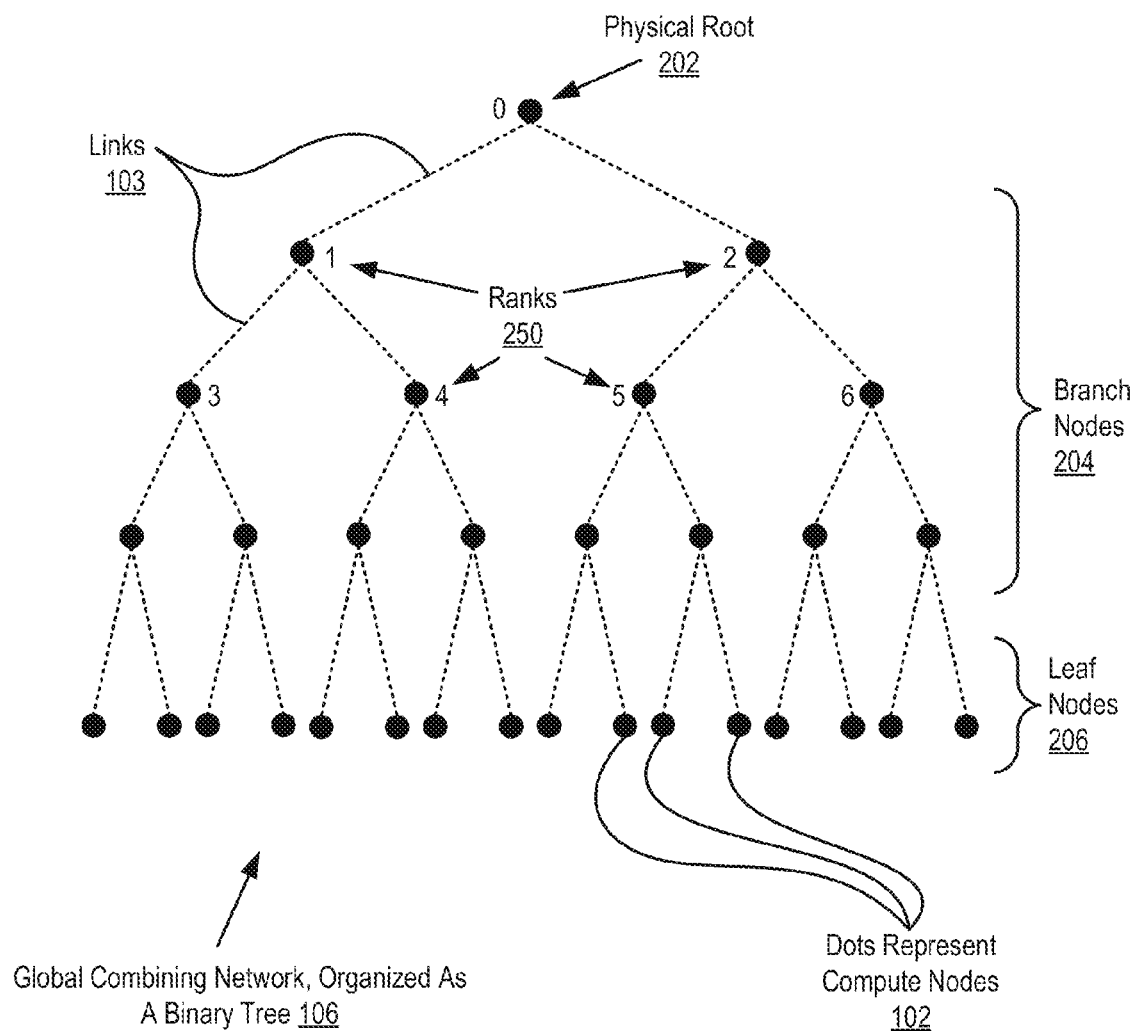
FIG. 7 sets forth a line drawing illustrating an example global combining network useful in systems capable of administering VMs in a distributed computing environment according to embodiments of the present invention.

For further explanation, FIG. 7 sets forth a line drawing illustrating an example global combining network (106) useful in systems capable of administering VMs in a distributed computing environment according to embodiments of the present invention. The example data communications network of FIG. 7 includes data communications links (103) connected to the compute nodes so as to organize the compute nodes as a tree. In the example of FIG. 7, dots represent compute nodes (102) of a parallel computer, and the dotted lines (103) between the dots represent data communications links between compute nodes. The data communications links are implemented with global combining network adapters similar to the one illustrated for example in FIG. 5, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 7 is illustrated with only 31 compute nodes, but readers will recognize that a global combining network (106) optimized for collective operations for use in administering VMs in a distributed computing environment in accordance with embodiments of the present invention may contain only a few compute nodes or may contain thousands of compute nodes.

In the example of FIG. 7, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

VM Administration Utilizing Broadcast Operations

Figure 8:
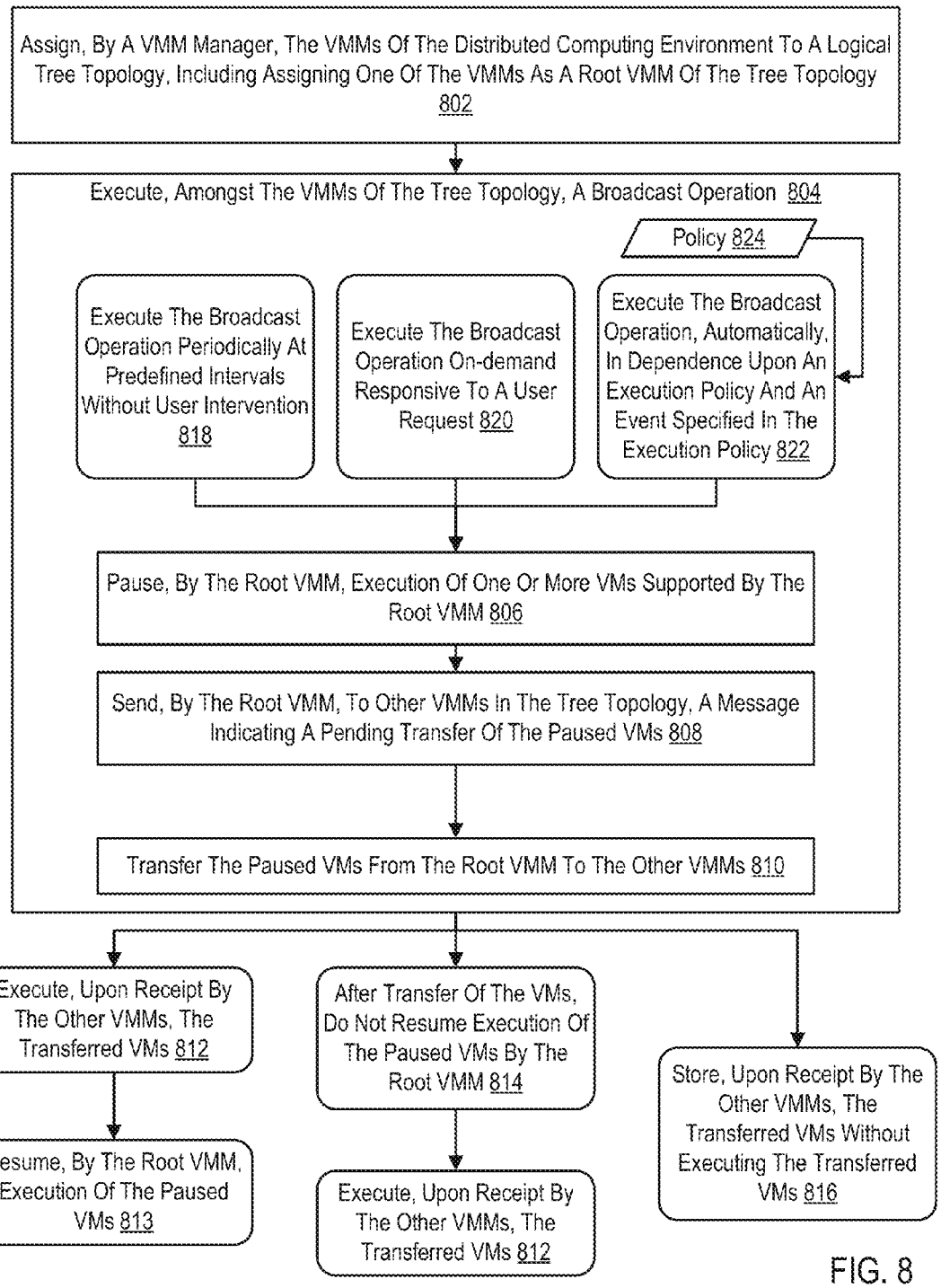
FIG. 8 sets forth a flow chart illustrating an example method for administering VMs in a distributed computing environment utilizing a collective broadcast operation according to embodiments of the present invention.

For further explanation, FIG. 8 sets forth a flow chart illustrating an example method for administering VMs in a distributed computing environment utilizing a collective broadcast operation according to embodiments of the present invention. The method of FIG. 8 may be carried out in a distributed computing environment similar to that set forth in the example system of FIG. 1 and the example parallel computer of FIG. 2. Such a distributed computing environment may include a plurality of hosts, with one or more of the hosts executing a VMM. In such an environment, each VMM may support execution of one or more VMs.

The method of FIG. 8 includes assigning (802), by a VMM manager, the VMMs of the distributed computing environment to a logical tree topology. In the example of FIG. 1, assigning (802) VMMs to a logical tree topology also includes assigning one of the VMMs as a root VMM of the tree topology.

Assigning (802) VMMs to a logical tree topology may be carried out in various ways. In some embodiments, the assignment may be carried out based on physical network characteristics of the hosts upon which the VMMs execute. That is, the VMM manager may assign VMMs as parent-children pairs when such the hosts of those VMMs are closely coupled, physically, for network communications (e.g. shortest hops, fewest interceding network devices, closest physical distance, and the like). The VMM manager may record such assignments and each VMM's relationship to parent and child VMMs in the tree in a data structure. The VMM manager may then provide the data structure to each of the VMMs in the logical tree topology or may provide, separately to each VMM, only the parent and child relationships for that VMM. Readers of skill in the art will recognize that these are just a few ways, among many possible ways, in which a VMM manager may assign VMMs to a logical tree topology.

The method of FIG. 8 also includes executing (804), amongst the VMMs of the tree topology, a broadcast operation. As mentioned above, a broadcast operation is generally effected when data is sent from the root of a logical tree to all other nodes in the logical tree. In the example of FIG. 8, executing (804) the broadcast operation includes pausing (806), by the root VMM, execution of one or more VMs supported by the root VMM; sending (808), by the root VMM, to other VMMs in the tree topology, a message indicating a pending transfer of the paused VMs; and transferring (810) the paused VMs from the root VMM to the other VMMs. Here, the data broadcast from the root VMM to other VMMs of the logical tree topology is one or more VMs supported by the root VMM.

Pausing (806) execution of the VMs may be carried out in various ways, including, for example, by the VMM manager raising an interrupt or an exception in the process or processes that effect the execution of the VMs to be paused. From the perspective of the VM, the VM's host processor is stopped. Because such a processor is, in fact, a simulation, the operation of which can be controlled by the VMM manager, the VMM manager may effectively hold execution of a VM without simulating a power-off in the virtual machine or booting the virtual machine down.

The root VMM may send (808), to other VMMs in the tree topology, a message indicating a pending transfer of the paused VMs in a variety of ways. In some embodiments, each VMM is configured with a 'mailbox' or message queue established and designated for the sole use of receiving messages from the root or other VMMs in the logical tree. The message in the example of FIG. 8 may include an identification of an upcoming transfer of data in the form of VMs and the size of the VMs to be transferred, and a logical identifier of the memory space in which to store the VMs (a 'handle'). Responsive to such a message, the other VMMs may allocate memory space using the provided handle and in the size indicated in the message.

The root VMM may transfer (810) the paused VMs to the other VMMs of the logical tree topology in a variety of ways. In some embodiments, the root VMM may transfer the paused VMs in multiple data communications messages. In some embodiments, the distributed computing environment is a parallel computer, the hosts upon which the VMMs are executing are compute nodes of the parallel computer, each of the compute nodes is configured with a plurality of communications adapters, and each communications adapter is configured to couple the compute node to other compute nodes for data communications through one of a plurality of data communications networks. In such a parallel computer, transferring (810) the paused VMs may be carried out via one or more of the networks. In some examples, the networks include a multi-dimensional, point-to-point network and a global combining network similar to those set forth in the example of FIGS. 3, 4, 5, 6, and 7. In a point-to-point network, for example, Direct Memory Access (DMA) operations including either remote GET or direct PUT operations, may be utilized to transfer the paused VMs from a memory location in the root VMM directly to a memory location in the children of the root VMM and in the same fashion down the tree, until all VMMs of the tree topology have received or retrieved the data.

In the example of FIG. 8, the broadcast operation may be executed (804) at various times. In some embodiments, executing (804) the broadcast operation may be carried out by executing (818) the broadcast operation periodically at predefined intervals without user intervention. Consider, for example, that at a particular time in the evening every day, all VMs of the root VMM are migrated through use of the broadcast operation to the non-root VMMs.

In other embodiments, executing (804) the broadcast operation may be carried out by executing (820) the broadcast operation on-demand responsive to a user request. For example, the VMM manager may provide a graphical user interface or other interface means by which a user, such as a system administrator, may request a migration or distributed checkpoint of the VMs executing under control or supported by a particular VMM.

In yet other embodiments, executing (804) the broadcast operation may be carried out by executing (822) the broadcast operation, automatically without user intervention, in dependence upon an execution policy (824) and responsive to an event specified in the execution policy. An execution policy, as the term is used in this specification, refers to a specification of one or more actions to take upon an occurrence of one or more events. Consider, for example, an execution policy that specifies a duplication of all the VMs on the root VMM if the workload executing within the VMs of the root VMM has not completed within particular amount of time. Consider, as another example, an execution policy that specifies migration of VMs from the root VMM to all other VMs upon the processor of the root VMM's host machine reaching a particular temperature.

VMs may be transferred from the root VMM to the other VMMs in the logical tree for a variety of purposes including duplication, distributed checkpointing, migration and the like. To that end, the method of FIG. 8 also includes executing (812), upon receipt by the other VMMs, the transferred VMs and resuming (813), by the root VMM, execution of the paused VMs. In this way, execution of the VMs is duplicated on all VMMs in the logical tree including the root VMM.

The method of FIG. 8 also includes not resuming (814) execution of the paused VMs by the root VMM, and executing (815), upon receipt by the other VMMs, the transferred VMs. In this way, the VMs are migrated from the root VMM to the non-root VMMs and execution continues on the non-root VMMs from the point at which the VMs were paused.

The method of FIG. 8 also includes storing (816), upon receipt by the other VMMs, the transferred VMs without executing the transferred VMs. In this way, a copy of the VMs, paused at a particular point during execution, may be provided to all non-root VMMs and stored as a checkpoint (or 'backup') from which another VMM may restore execution at a future time. Further, the checkpoint is distributed to many VMMs thereby reducing risk of losing the checkpoint data due to failure host machine failure.

Figure 9:
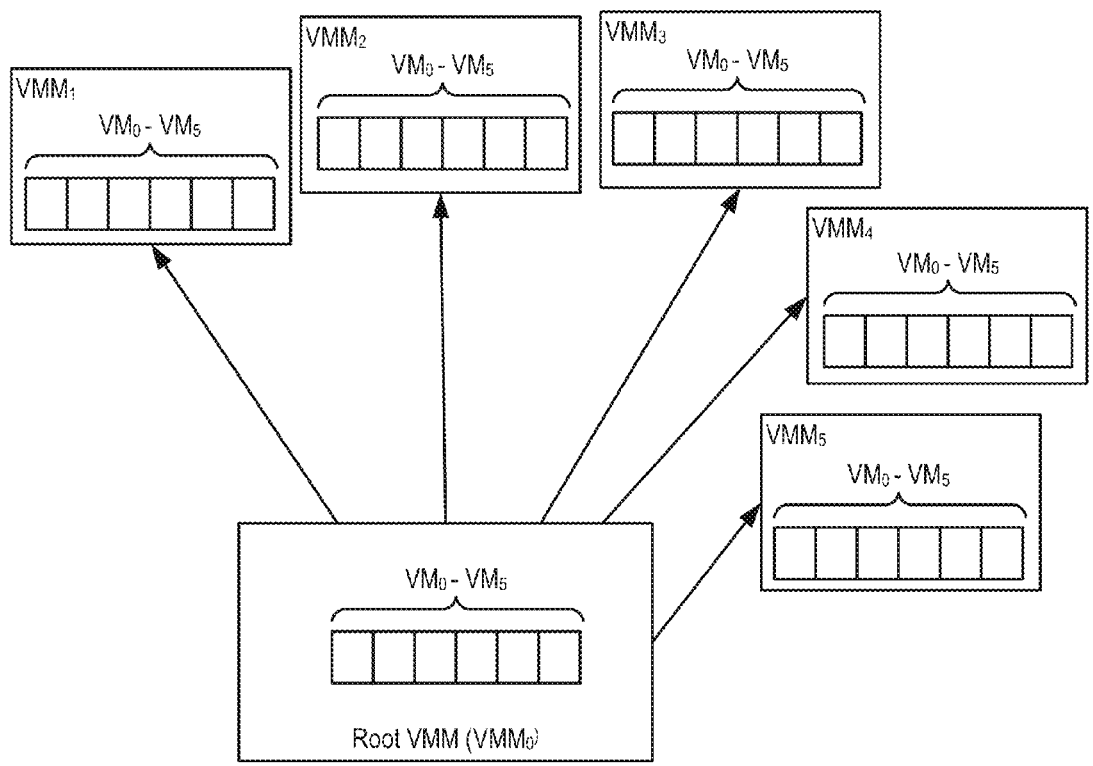
FIG. 9 sets forth a block diagram illustrating an example distributed computing environment in which VMs are administered utilizing a collective broadcast operation according to embodiments of the present invention.

For further explanation, FIG. 9 sets forth a block diagram illustrating an example distributed computing environment in which VMs are administered utilizing a collective broadcast operation according to embodiments of the present invention. The example environment of FIG. 9 includes six VMMs ($VMM_0$-$VMM_5$) which are assigned to a logical tree topology with one VMM ($VMM_0$) being assigned as a root and all other VMMs being assigned as a child of the root.

The root VMM ($VMM_0$) in the example of FIG. 9 supports execution of six VMs ($VM_0$-$VM_5$). The VMMs in the example of FIG. 9 may execute a broadcast operation by the root VMM ($VMM_0$) pausing execution of one or more VMs ($VM_0$-$VM_5$) supported by the root VMM; sending, by the root VMM, to other VMMs in the tree topology, a message indicating a pending transfer of the paused VMs; and transferring the paused VMs ($VM_0$-$VM_5$) from the root VMM to the other VMMs. In the example of FIG. 9, all VM's supported by the root are transferred to all VMMs in the logical tree topology. After all VMMs in the logical tree topology have received the transferred VMs, the VMs may be executed (for migration or duplication) or stored (for checkpointing).

VM Administration Utilizing Scatter Operations

Figure 10:
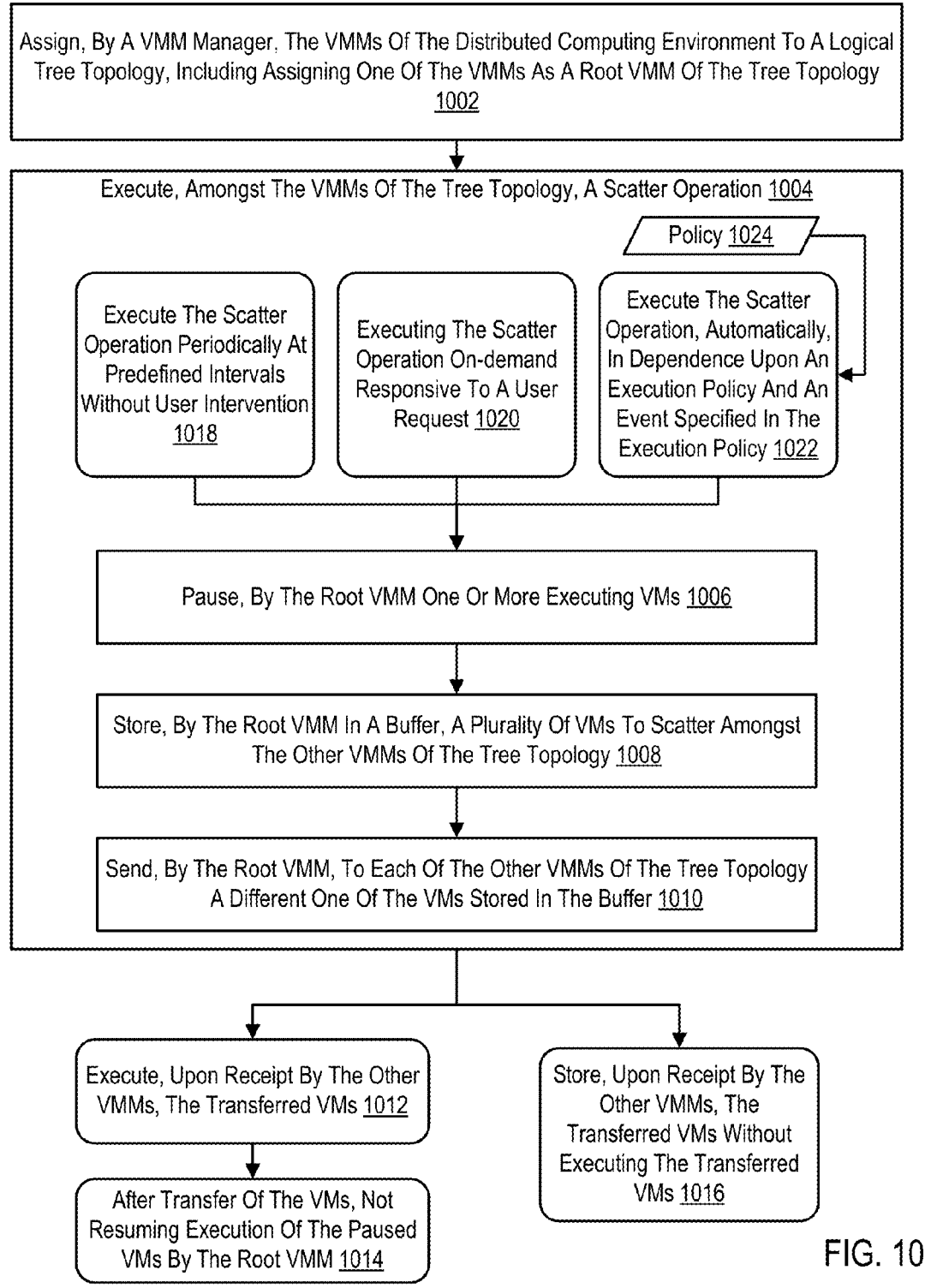
FIG. 10 sets forth a flow chart illustrating an example method for administering VMs in a distributed computing environment utilizing a collective scatter operation according to embodiments of the present invention.

For further explanation, FIG. 10 sets forth a flow chart illustrating an example method for administering VMs in a distributed computing environment utilizing a collective scatter operation according to embodiments of the present invention. The method of FIG. 10 is similar to the method of FIG. 8 in that the method of FIG. 10 may be carried out in a similar distributed computing environment. Further, the method of FIG. 10 includes assigning (1002), by a VMM manager, the VMMs of the distributed computing environment to a logical tree topology, including assigning one of the VMMs as a root VMM of the tree topology. Assigning the VMMs of the distributed computing environment may be carried out as described above with respect to a similar assignment (802) in FIG. 8.

The method of FIG. 10 differs from the method of FIG. 8, however, in that the method of FIG. 10 includes executing (1004), amongst the VMMs of the tree topology, a scatter operation. In the method of FIG. 10, executing (1004) a scatter operation includes: pausing (1006), by the root VMM one or more executing VMs; storing (1008), by the root VMM in a buffer, a plurality of VMs to scatter amongst the other VMMs of the tree topology; and sending (1010), by the root VMM, to each of the other VMMs of the tree topology a different one of the VMs stored in the buffer.

Pausing (1006) the VMs may be carried out as described above. Storing (1008) the plurality of VMs to scatter in a buffer may be carried out by allocating a buffer with a number of elements equal to the number of VMMs in the tree topology less one for the root, where each element is equal to or greater that the size of the largest VM to be scattered. Then, in each element of the buffer, the root VM may store a different VM to be scattered. Such a buffer may be allocated in a number of different data structures, including, for example, a linked list. In some embodiments, storing (1008) a VM in an element of the buffer may be carried out by storing a pointer to the memory location of the VM in an element, so that the buffer itself may remain relatively small.

In the method of FIG. 10, sending (1010), to each non-root VMM, a different VM stored in the buffer may be carried out in a variety of ways. In some embodiments, the sending (1010) may be carried out with a plurality of data communications message, each message sent to a non-root VMM with a portion of the data forming a VM. In another embodiment, the root VMM may send (1010) a different VM to each non-root VMM by sending a pointer and an offset to the non-root VMM. The pointer may point to a memory location in the root VMM's memory space for the beginning memory address of the VM and the offset indicates the entire size of the VM such that the non-root VMM may retrieve the VM from the root VMM's memory directly.

Further, as mentioned above with respect to FIG. 8, the distributed computing environment may be implemented as a parallel computer with compute nodes operating as hosts of the VMMs and the VMs, where each of the compute nodes include a plurality of communications adapters configured to couple the compute nodes for data communications through a plurality of different networks. In such a parallel computer, sending (1010) the VMs may be carried out via one or more of the networks. In some examples, the networks include a multi-dimensional, point-to-point network and a global combining network similar to those set forth in the example of FIGS. 3, 4, 5, 6, and 7. In a point-to-point network, for example, Direct Memory Access (DMA) operations including either remote GET or direct PUT operations, may be utilized to send the VMs from a memory location in the root VMM directly to a memory location in the children of the root VMM and in the same fashion down the tree, until all VMMs of the tree topology have received or retrieved the data.

Executing (1004) the scatter operation in the example of FIG. 10 may be carried out at various times or for various reasons. In the method of FIG. 10, for example, executing (1004) the scatter operation includes executing (1018) the scatter operation periodically at predefined intervals without user intervention; executing (1020) the scatter operation on-demand responsive to a user request; or executing (1022) the scatter operation, automatically without user intervention, in dependence upon an execution policy (1024) and responsive to an event specified in the execution policy.

VMs may be sent from the root to non-root VMMs in a scatter operation for a variety of purposes including duplication, distributed checkpointing, migration and the like. To that end, the method of FIG. 10 includes executing (1012), upon receipt by the other VMMs, the transferred VMs. Once each of the VMMs receives a different VM and executes, the VMs have effectively been migrated to the other VMMS or execution has been duplicated on the other VMMs. Whether migration or duplication has been effected is determined in dependence upon the actions of the root VMM after sending (1010) the VMs to the non-root VMMs. In FIG. 10, for example, after transferring the VMs, the root VMM does not resume (1014) execution of the paused VMMs. In such an example, the scatter operation effects a migration of the VMs from the root VMM to the non-root VMMs. In other embodiments in which all VMMs in the tree execute the VMs, the scatter operation effects duplication of execution of the VMs. That is, in such an embodiment, each VM originally executing on the root VMM executes on two VMMs (the root and one other VMM) after the scatter operation.

The method of FIG. 10 also includes storing (1016), upon receipt by the other VMMs, the transferred VMs without executing the transferred VMs. In this way, each non-root VMM that receives a VM operates as a repository for a checkpoint of that VM.

Figure 11:
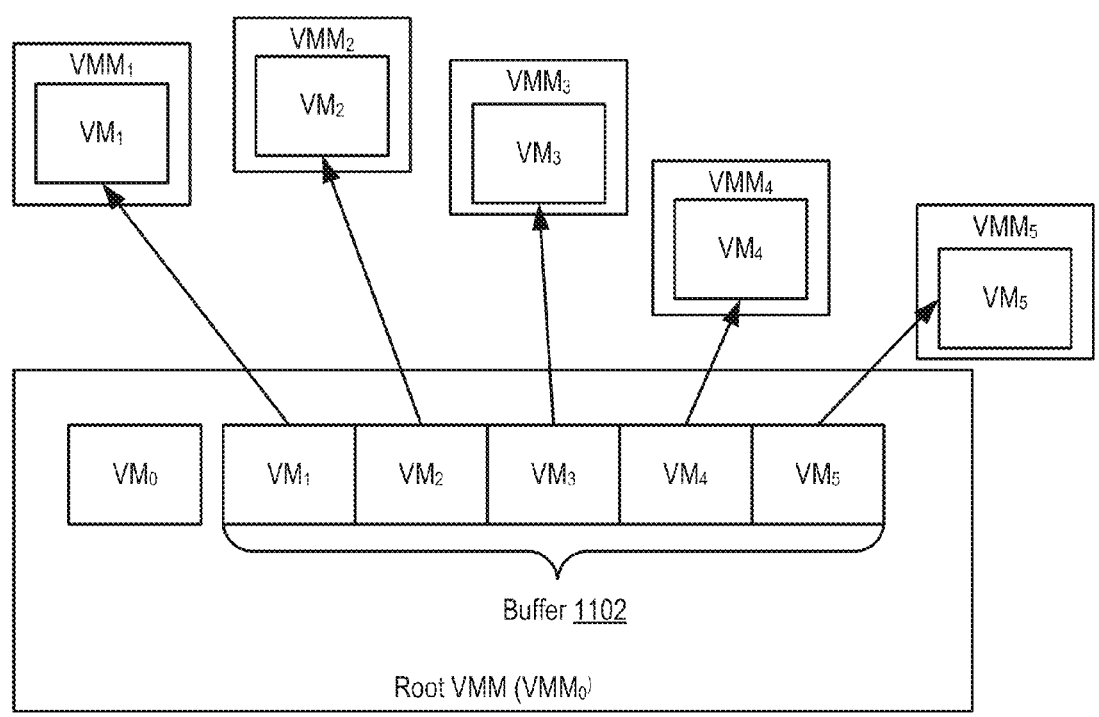
FIG. 11 sets forth a block diagram illustrating an example distributed computing environment in which VMs are administered utilizing a collective scatter operation according to embodiments of the present invention.

FIG. 11 sets forth a block diagram illustrating an example distributed computing environment in which VMs are administered utilizing a collective scatter operation according to embodiments of the present invention. The example environment of FIG. 11 includes six VMMs (VMM$_0$-VMM$_5$) which are assigned to a logical tree topology with one VMM (VMM$_0$) being assigned as a root and all other VMMs being assigned as a child of the root.

The root VMM (VMM$_0$) in the example of FIG. 11 supports execution of six VMs (VM$_0$-VM$_5$). The VMMs in the example of FIG. 11 may execute a scatter operation by: pausing, by the root VMM one or more executing VMs (VM$_1$-VM$_5$); storing, by the root VMM in a buffer (1102), a plurality of VMs (VM$_1$-VM$_5$) to scatter amongst the other VMMs (VMM$_1$-VMM$_5$) of the tree topology; and sending, by the root VMM (VMM$_0$), to each of the other VMMs (VMM$_1$-VMM$_5$) of the tree topology a different one of the VMs stored in the buffer. In FIG. 11, for example, the root VMM sends VM$_1$ to VMM$_1$, VM$_2$ to VMM$_2$, VM$_3$ to VMM$_3$, VM$_4$ to VMM$_4$, and VM$_5$ to VMM$_5$. By sending a different VM to each VMM, the VMMs effect a scatter operation (contrasted with a broadcasted operation where all VMMs receives all VMs).

One type of scatter operation is a scattery (referring to 'variable') operation. To that end, FIG. 12 sets forth a flow chart illustrating an example method for administering VMs in a distributed computing environment utilizing a collective scattery operation according to embodiments of the present invention. The method of FIG. 12 is similar to the method of FIG. 10 in that the method of FIG. 12 includes assigning (1002) the VMMs to a logical tree topology and executing (1004) a scatter operation. The example method of FIG. 12 differs from the method of FIG. 10, however, in that in the method of FIG. 12, executing (1004), amongst the VMMs of the tree topology, a scatter operation includes executing (1202), amongst the VMMs of the tree topology, a scattery operation. In sending (1010) a different one of the VMs stored in the buffer to each of the other VMMs to effect the scattery operation, the method of FIG. 12 includes sending (4) an unequal number of VMs to at least two VMMs. In such a scattery operation, the root VMM may effect a migration of VMs in terms of priority. That is, the root VMM may send the highest priority VMs to the most powerful (in terms of computer hardware or software resources) host, while the root VMM sends lower priority VMs to slower hardware hosts and the like. The root VMM may also couple organize the VMs into groups based on workload type and send (1204) the groups of VMs to different VMMs. These are but a few reasons to effect a scattery operation with the VMMs. Readers of skill in the art will recognize that there may be many reasons.

Figure 13:
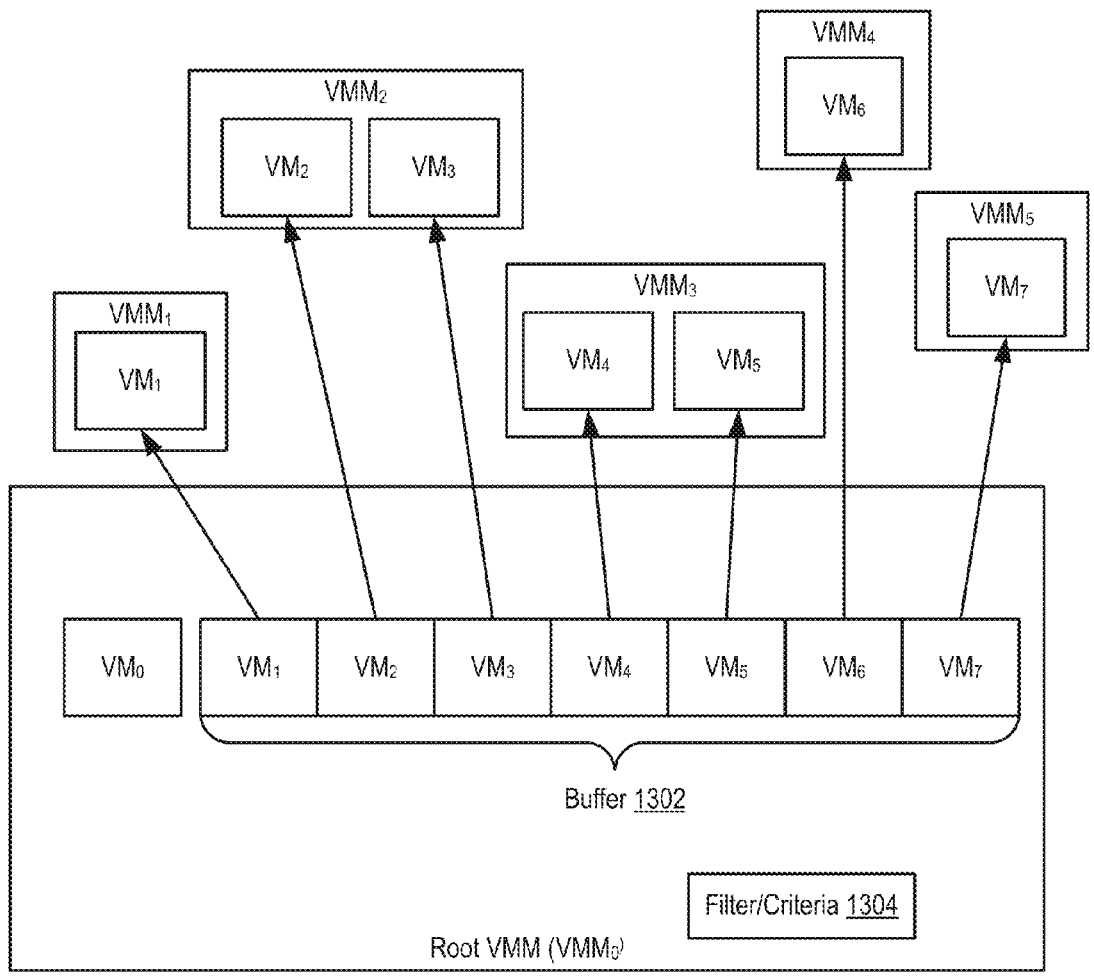
FIG. 13 sets forth a block diagram illustrating an example distributed computing environment in which VMs are administered utilizing a collective scattery operation according to embodiments of the present invention.

For further explanation, FIG. 13 sets forth a block diagram illustrating an example distributed computing environment in which VMs are administered utilizing a collective scattery operation according to embodiments of the present invention. The example environment of FIG. 12 includes six VMMs (VMM$_0$-VMM$_5$) which are assigned to a logical tree topology with one VMM (VMM$_0$) being assigned as a root and all other VMMs being assigned as a child of the root.

The root VMM (VMM$_0$) in the example of FIG. 11 supports execution of eight VMs (VM$_0$-VM$_7$). The VMMs in the example of FIG. 11 may execute a scattery operation by: pausing, by the root VMM one or more executing VMs (VM$_1$-VM$_7$); storing, by the root VMM in a buffer (1302), a plurality of VMs (VM$_1$-VM$_7$) to scatter amongst the other VMMs (VMM$_1$-VMM$_5$) of the tree topology; and sending by the root VMM (VMM$_0$), an unequal number of VMs to at least two VMMs. In the example of FIG. 13, the root VMM, in accordance with the filter or criteria (1304), sends VM$_1$ to VMM$_1$, VM$_2$ and VM$_3$ to VMM$_2$, VM$_4$ and VM$_5$ to VMM$_3$, VM$_6$ to VMM$_4$, and VM$_7$ to VMM$_5$.

VM Administration Utilizing Gather Operations

Figure 14:
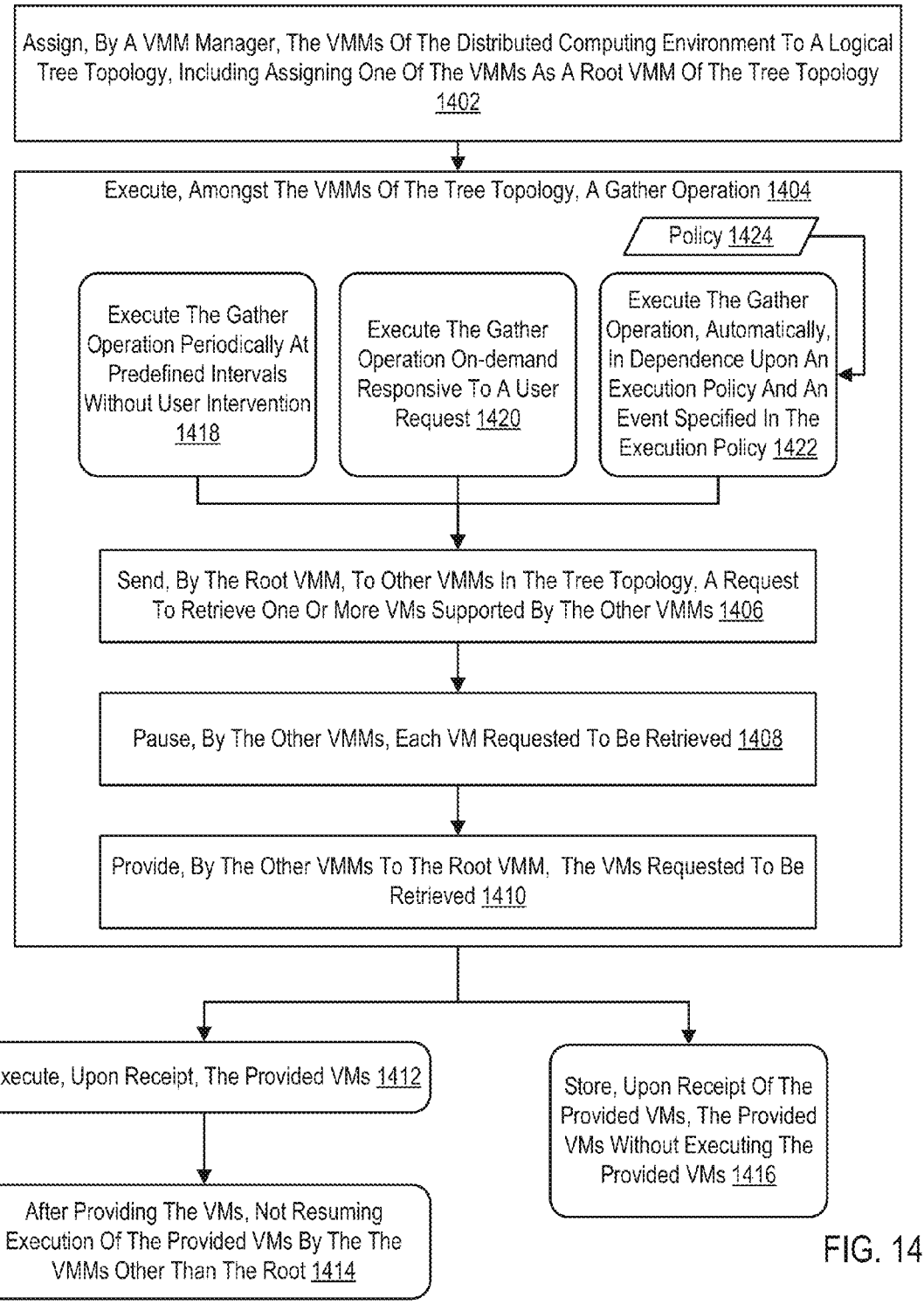
FIG. 14 sets forth a flow chart illustrating an example method for administering VMs in a distributed computing environment utilizing a collective gather operation according to embodiments of the present invention.

FIG. 14 sets forth a flow chart illustrating an example method for administering VMs in a distributed computing environment utilizing a collective gather operation according to embodiments of the present invention. The method of FIG. 14 is similar to the method of FIG. 8 in that the method of FIG. 14 may be carried out in a similar distributed computing environment and includes assigning (1402), by a VMM manager, the VMMs of the distributed computing environment to a logical tree topology, including assigning one of the VMMs as a root VMM of the tree topology. Assigning (1402) the VMMs of the distributed computing environment may be carried out as described above with respect to a similar assignment (802) in FIG. 8.

The method of FIG. 14 differs from the method of FIG. 8, however, in that the method of FIG. 14 includes executing (1404), amongst the VMMs of the tree topology, a gather operation. In the method of FIG. 14, executing (1404) the gather operation includes: sending (1406), by the root VMM, to other VMMs in the tree topology, a request to retrieve one or more VMs supported by the other VMMs; pausing (1408), by the other VMMs, each VM requested to be retrieved; and providing (1410), by the other VMMs to the root VMM, the VMs requested to be retrieved.

The distributed computing environment in which the example method of FIG. 14 is carried out may be implemented as a parallel computer. Such a parallel computer may include a plurality of compute nodes, with each of the compute nodes operating as one of the plurality of hosts and executing at least one of the VMMs. Each of the compute nodes may also include plurality of communications adapters, with each communications adapter configured to couple the compute node to other compute nodes for data communications and to one of a plurality of data communications networks. In some embodiments, the networks may include a multi-dimensional, point-to-point network and a global combining network. In such embodiments, providing (1410) the requested VMs to the root VMM may be carried out through use of the point-to-point network, the global combining network, some combination of the two, with DMA access, through messaging, or any number of other ways as will occur to readers of skill in the art.

In the method of FIG. 14, executing (1404) the gather operation may be carried out at various times. Executing (1404) the gather operation may, for example, include executing (1418) the gather operation periodically at pre-defined intervals without user intervention. Executing (1404) the gather operation may also include executing (1420) the gather operation on-demand responsive to a user request. Executing (1404) the gather operation may also include executing (1422) the gather operation, automatically without user intervention, in dependence upon an execution policy (1424) and responsive to an event specified in the execution policy.

Once the requested VMs have been provided to the root VMM, the method of FIG. 14 includes executing (1412), by the root VMM, the provided VMs upon receipt. In this way, the gather operation effects of a many-to-one migration or duplication of execution of the provided VMs. In embodiments in which the source VMMs resume execution of the VMs after providing the VMs to the root VMM and the root VMM executes the received VMs, execution of the VMs is duplicated. By contrast, the method of FIG. 14 also includes not resuming (1414) execution of the provided VMs by the VMMs other than the root after providing the VMs. In this way, the gather operation effects a many-to-one migration of VMs to the root VMM.

The method of FIG. 14 also includes storing (1416), upon receipt of the provided VMs, the provided VMs without executing the provided VMs. In this way, the root VM operates a repository for checkpoints of VMs executing on other VMMs. In such an embodiment, the pausing (1408) of the VM to may last only long enough to store a copy of the VM to provide to the root VMM, then execution may be immediately restored.

Figure 15:
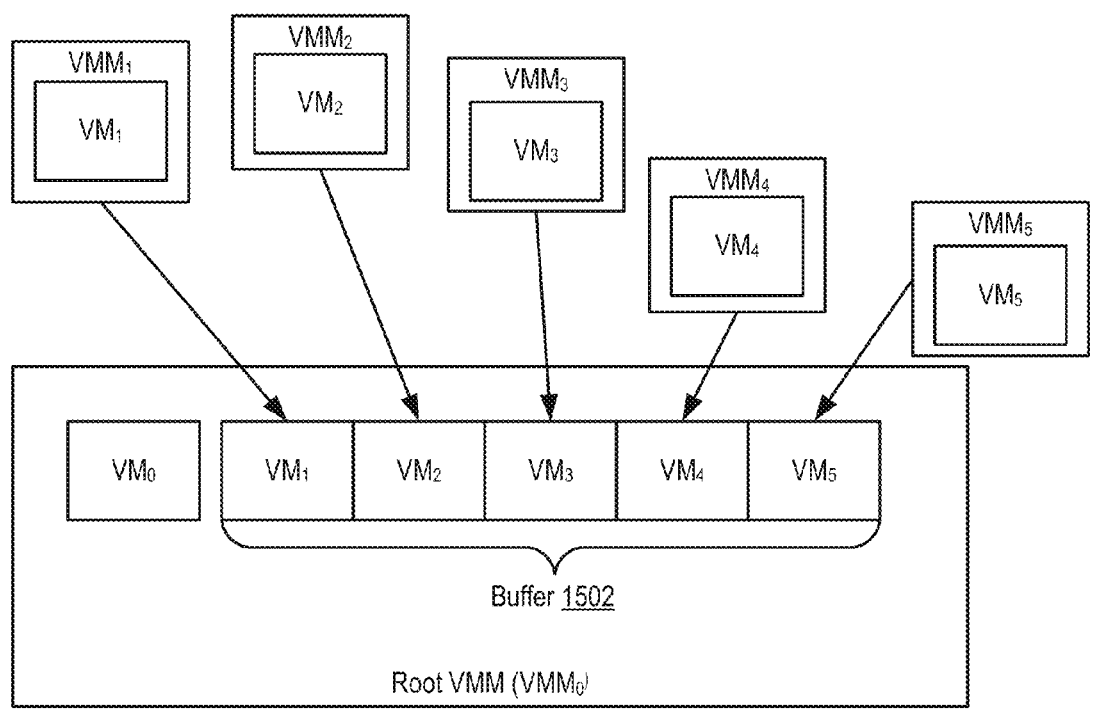
FIG. 15 sets forth a block diagram illustrating an example distributed computing environment in which VMs are administered utilizing a collective gather operation according to embodiments of the present invention.

For further explanation, FIG. 15 sets forth a block diagram illustrating an example distributed computing environment in which VMs are administered utilizing a collective gather operation according to embodiments of the present invention. The example environment of FIG. 15 includes six VMMs (VMM$_0$-VMM$_5$) which are assigned to a logical tree topology with one VMM (VMM$_0$) being assigned as a root and all other VMMs being assigned as a child of the root.

The root VMM (VMM$_0$) in the example of FIG. 15 supports execution of one VM (VM$_0$) prior to a gather operation with each of the other VMMs supporting execution of a different, single VM. The VMMs in the example of FIG. 15 may execute a gather operation by: sending, by the root VMM (VMM$_0$), to other VMMs in the tree topology, a request to retrieve one or more VMs (VM$_1$-VM$_5$) supported by the other VMMs; pausing, by the other VMMs (VMM$_1$-VMM$_5$), each VM requested to be retrieved; and providing, by the other VMMs (VMM$_1$-VMM$_5$) to the root VMM (VMM$_0$), the VMs requested to be retrieved. The root VMM (VMM$_0$) stores the received VMs in a buffer (1502). VMM$_1$ provides VM$_1$ to the root, VMM2 provides VM$_2$ to the root, VMM3 provides VM$_3$ to the root, VMM4 provides VM$_4$ to the root, and VMM$_5$ provides VM$_5$ to the root.

Figure 16:
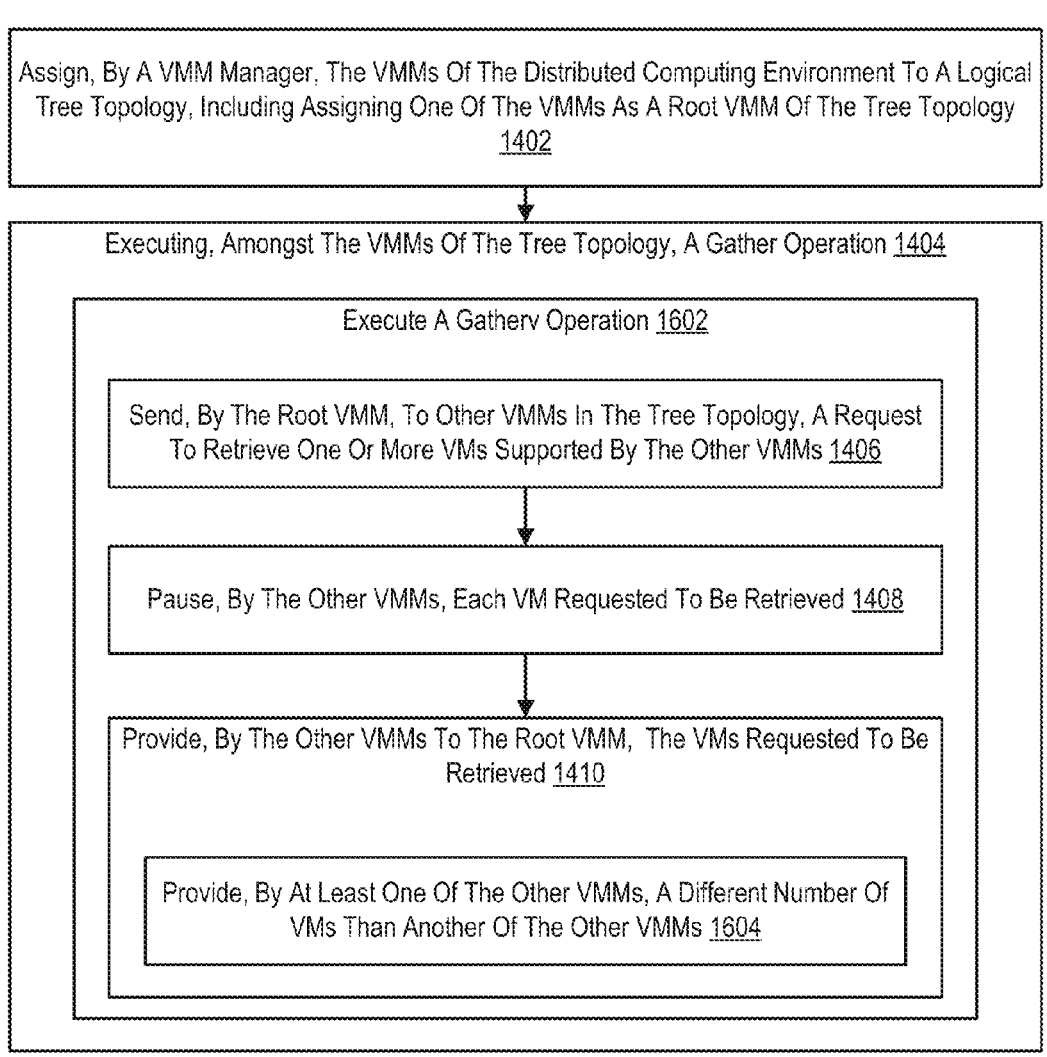
FIG. 16 sets forth a flow chart illustrating an example method for administering VMs in a distributed computing environment utilizing a collective gatherv operation according to embodiments of the present invention.

One type of gather operation is a gatherv operation in which different counts (size or number of discrete components) of data may be retrieved from different sources. For further explanation, therefore, FIG. 16 sets forth a flow chart illustrating an example method for administering VMs in a distributed computing environment utilizing a collective gatherv operation according to embodiments of the present invention. The method of FIG. 16 is similar to the method of FIG. 14 in that the method of FIG. 16 also includes assigning (1402) the VMMs to a logical tree topology and executing (1404) a gather operation. The method of FIG. 16 differs from the method of FIG. 16, however, in that in the method of FIG. 16 executing (1404) the gather operation is carried out by executing (1602) a gatherv operation and providing (1410) the VMs requested to be retrieved is carried out by providing (1604), by at least one of the other VMMs, a different number of VMs than another of the other VMMs.

Figure 17:
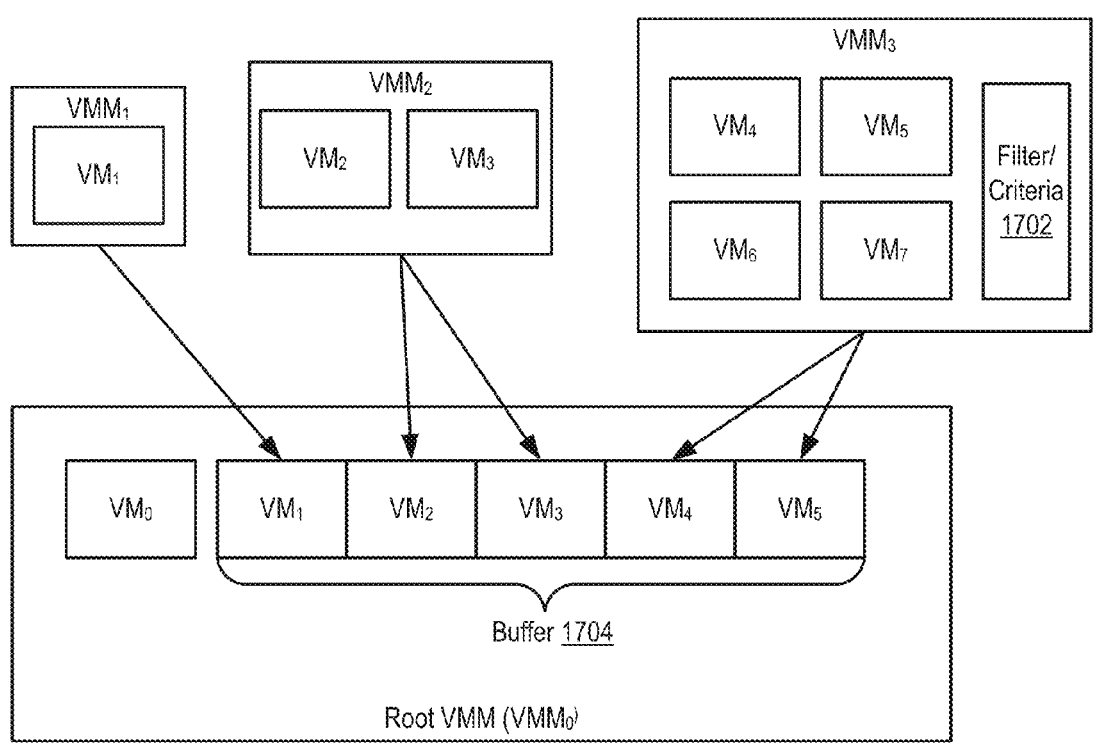
FIG. 17 sets forth a block diagram illustrating an example distributed computing environment in which VMs are administered utilizing a collective gatherv operation according to embodiments of the present invention.

For further explanation, FIG. 17 sets forth a block diagram illustrating an example distributed computing environment in which VMs are administered utilizing a collective gatherv operation according to embodiments of the present invention. The example environment of FIG. 17 includes four VMMs (VMM$_0$-VMM$_3$) which are assigned to a logical tree topology with one VMM (VMM$_0$) being assigned as a root and all other VMMs being assigned as a child of the root.

The root VMM (VMM$_0$) in the example of FIG. 15 supports execution of one VM (VM$_0$) prior to a gatherv operation with each of the other VMMs supporting execution of a different number of VMs. The VMMs in the example of FIG. 15 may execute a gather operation by: sending, by the root VMM (VMM$_0$), to other VMMs in the tree topology, a request to retrieve one or more VMs (VM$_1$-VM$_5$) supported by the other VMMs; pausing, by the other VMMs (VMM$_1$-VMM$_3$), each VM requested to be retrieved; and providing, by the other VMMs (VMM$_1$-VMM$_3$) to the root VMM (VMM$_0$), the VMs requested to be retrieved. The root VMM (VMM$_0$) stores the received VMs in a buffer (1502). In the example of FIG. 17, VMM$_1$ provides VM$_1$ to the root, VMM$_2$ provides VM$_2$ and VM$_3$ to the root, VMM3 provides VM$_4$ and VM$_5$ to the root. The selection of the VMs to be provided may be carried out in various ways. For example, the root VMM, in sending the request to retrieve VMs may uniquely identify those VMs requested for retrieval. In other embodiments, the root VMM requests VMs for retrieval without any knowledge of the number of VMs that will be provided by any one of the VMMs. Then, in dependence upon the filter or pre-defined criteria (1702), each VMM may separately identify VMs supported by that VMM to provide as a response to the request for retrieval. Such filter or criteria may be user specified, static, dynamically modified, and may include any type of criteria that may be utilized to select a number of VMs among a plurality of VMs.

VM Administration Utilizing Allgather Operations

Figure 18:
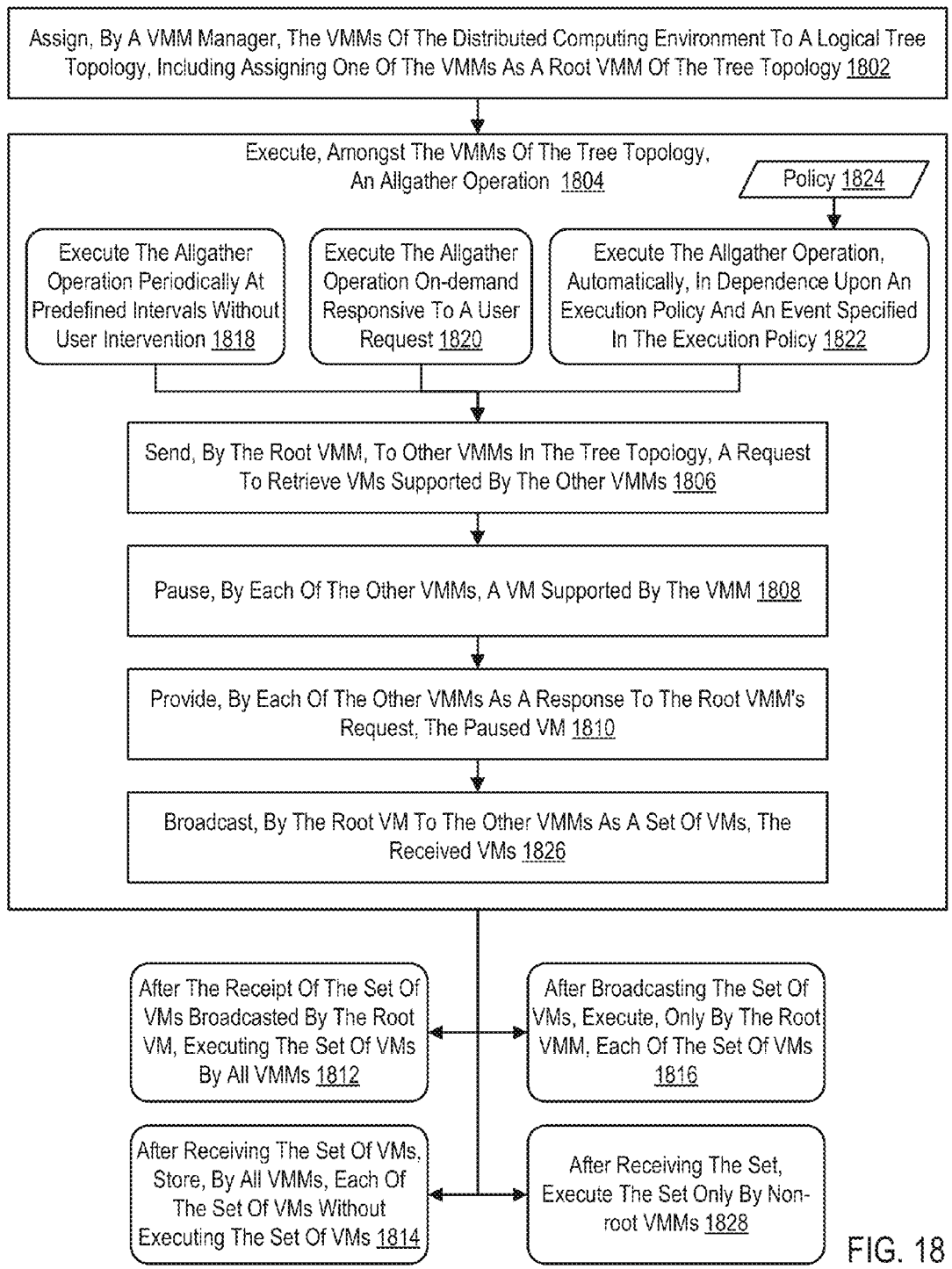
FIG. 18 sets forth a flow chart illustrating an example method for administering VMs in a distributed computing environment utilizing a collective allgather operation according to embodiments of the present invention.

FIG. 18 sets forth a flow chart illustrating an example method for administering VMs in a distributed computing environment utilizing a collective allgather operation according to embodiments of the present invention. The method of FIG. 18 is similar to the method of FIG. 8 in that the method of FIG. 18 may be carried out in a similar distributed computing environment. Further, the method of FIG. 18 includes assigning (1802), by a VMM manager, the VMMs of the distributed computing environment to a logical tree topology, including assigning one of the VMMs as a root VMM of the tree topology. Assigning the VMMs of the distributed computing environment may be carried out as described above with respect to a similar assignment (802) in FIG. 8.

The method of FIG. 18 differs from the method of FIG. 18, however, in that the method of FIG. 18 includes executing (1804), amongst the VMMs of the tree topology, an allgather operation. In the method of FIG. 18, executing (1804) the allgather operation includes: sending (1806), by the root VMM, to other VMMs in the tree topology, a request to retrieve VMs supported by the other VMMs; pausing (1808), by each of the other VMMs, a VM supported by the VMM; providing (1810), by each of the other VMMs as a response to the root VMM's request, the paused VM; and broadcasting (1826), by the root VM to the other VMMs as a set of VMs, the received VMs. In this way, a set of all VMs executing on all VMMs in the logical tree topology may be gather and then provided to all VMMs. At the completion of such an allgather operation each VMM is in possession of the same VMs as all other VMs in the logical tree topology.

As described above with the other collective operations, the distributed computing environment in which the method of FIG. 18 is carried out may be implemented as a parallel computer. Such a parallel computer may include a plurality of compute nodes, with each of the compute nodes operating as one of the plurality of hosts and executing at least one of the VMMs. Each of the compute nodes may also include plurality of communications adapters, with each communications adapter configured to couple the compute node to other compute nodes for data communications and to one of a plurality of data communications networks. In some embodiments, the networks may include a multi-dimensional, point-to-point network and a global combining network. In such embodiments, providing (1810) the paused VMs and broadcasting (1826) the received VMs to the root VMM may be carried out through use of the point-to-point network, the global combining network, some combination of the two, with DMA access, through messaging, or any number of other ways as will occur to readers of skill in the art.

The allgather operation of FIG. 18 may be carried out at various times. In the method of FIG. 18, for example, executing (1804) the allgather operation may include executing (1818) the allgather operation periodically at predefined intervals without user intervention; executing (1820) the allgather operation on-demand responsive to a user request; or executing (1822) the allgather operation, automatically without user intervention, in dependence upon an execution policy (1824) and responsive to an event specified in the execution policy.

After the broadcast (1826) of the set of VMs, the VMMs may take various actions. The method of FIG. 18, for example, includes executing the set of VMs by all VMMs (including the root) after the receipt of the set of VMs broadcasted by the root VMM. In this way, the VMs are gathered, broadcast as a set, and execution of the VMs is duplicated in a many-to-many relationship among all VMMs in the logical tree topology.

The method of FIG. 18 also includes storing (1814), by all VMMs, each of the set of VMs without executing the set of VMs after receiving the set of VMs broadcasted by the root VMM. In this way, a checkpoint of each VM in the set of VMs are distributed across the entire logical tree.

The method of FIG. 18 also includes executing (1816), only by the root VMM, each of the set of VMs after broadcasting the set of VMs. In this way, the non-root VMMs migrate execution of the VMs to the root VMM while storing a checkpoint for each of the set of VMs at each VMM.

The method of FIG. 18 also includes executing (1828), only by VMMs other than the root VMM, each of the set of VMs after receiving the set of VMs. In this way, the root VMM operates as a repository of checkpoints for each of the set of VMs while the non-root VMMs operate to duplicate execution of the VMMs throughout the logical tree (on all but the root VMM). Duplication provides an opportunity for a "race to finish" environment, where a high priority workload may be duplicated on many different host machines and operating environments. Such an environment enables the workload to be executed in the shortest amount of time possible, without knowledge as to which host is actually going to provide the quickest execution.

Figure 19:
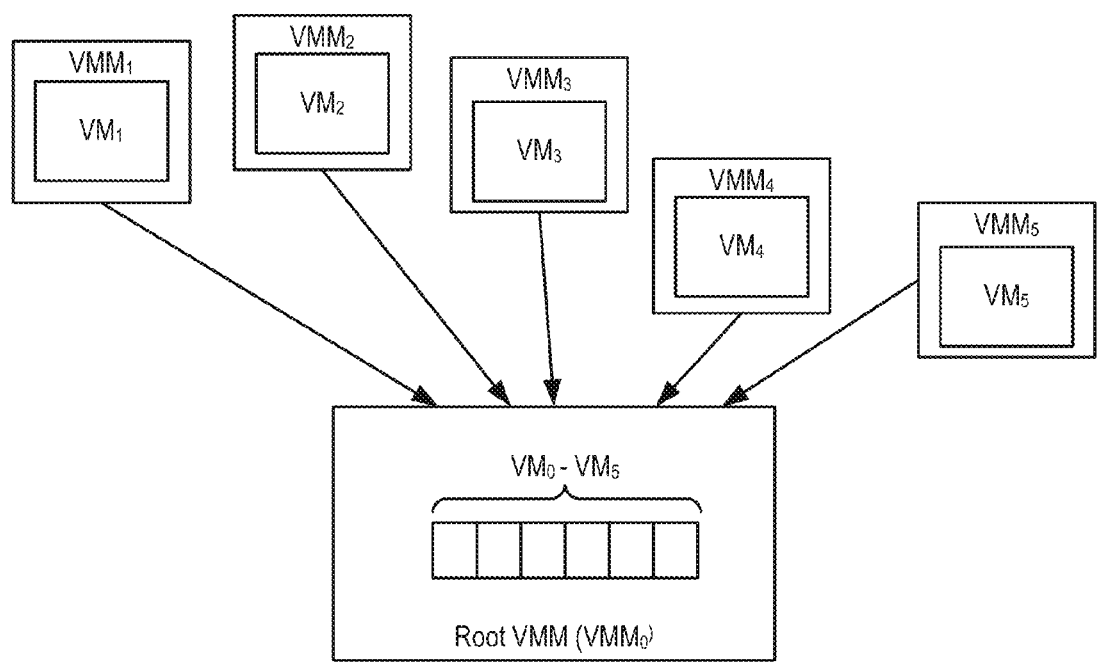
FIG. 19 and FIG. 20 set forth block diagrams illustrating an example distributed computing environment in which VMs are administered utilizing a collective allgather operation according to embodiments of the present invention.
Figure 20:
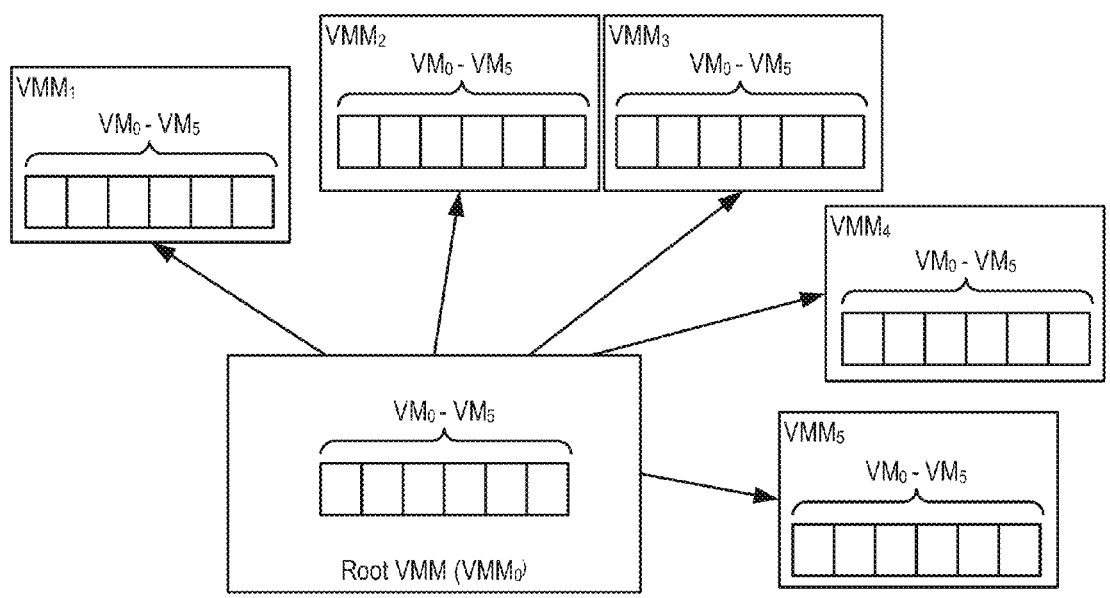

For further explanation, FIG. 19 and FIG. 20 set forth block diagrams illustrating an example distributed computing environment in which VMs are administered utilizing a collective allgather operation according to embodiments of the present invention.

Figure 21:
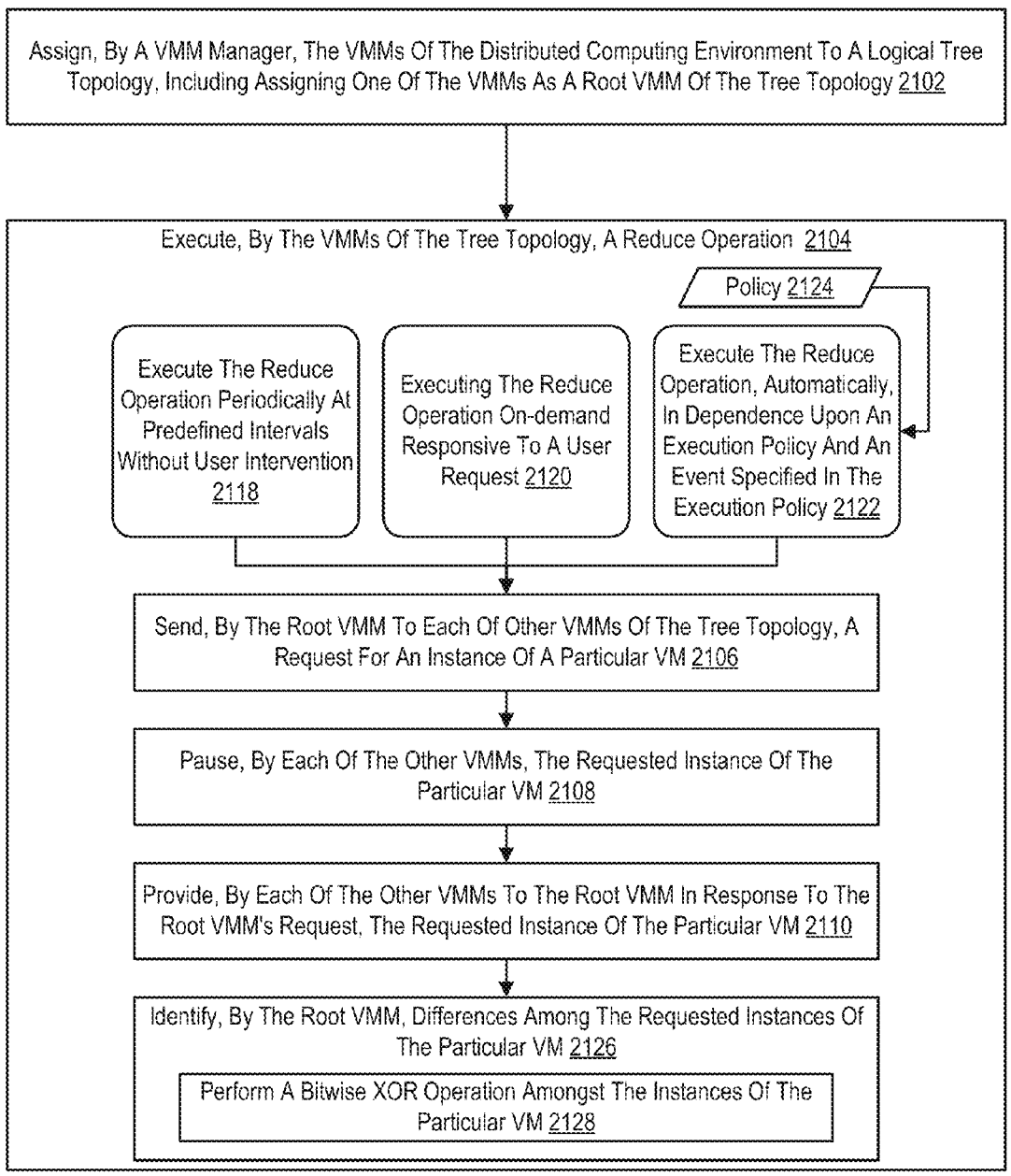
FIG. 21 sets forth a flow chart illustrating an example method for administering VMs in a distributed computing environment utilizing a collective reduce operation according to embodiments of the present invention.

FIG. 21 sets forth a flow chart illustrating an example method for administering VMs in a distributed computing environment utilizing a collective reduce operation according to embodiments of the present invention. The example environment of FIG. 17 includes six VMMs ($VMM_0$-$VMM_5$) which are assigned to a logical tree topology with one VMM ($VMM_0$) being assigned as a root and all other VMMs being assigned as a child of the root.

The VMMs ($VMM_0$-$VMM_5$) in the example of FIG. 15 each support execution of a different VM ($VM_0$-$VM_5$). The VMMs in the example of FIG. 15 may execute an allgather operation by: sending, by the root VMM, to other VMMs in the tree topology, a request to retrieve VMs supported by the other VMMs; pausing, by each of the other VMMs, a VM supported by the VMM; and providing, by each of the other VMMs as a response to the root VMM's request, the paused VM. The remainder of the allgather operation is described below with respect to FIG. 20. In FIG. 20, the root VMM ($VMM_0$), after receiving the VMs from the non-root VMMs, broadcasts, to the other VMMs as a set of VMs, the received VMs. In this way, each VMM has a copy of all VMs in the logical tree topology with corresponding VMs being paused at exactly the same point in execution.

VM Administration Utilizing Reduce Operations

FIG. 21 sets forth a flow chart illustrating an example method for administering VMs in a distributed computing environment utilizing a collective reduce operation according to embodiments of the present invention.

The method of FIG. 21 is similar to the method of FIG. 8 in that the method of FIG. 21 may be carried out in a similar distributed computing environment and includes assigning (1402), by a VMM manager, the VMMs of the distributed computing environment to a logical tree topology, including assigning one of the VMMs as a root VMM of the tree topology. Assigning (2102) the VMMs of the distributed computing environment may be carried out as described above with respect to a similar assignment (802) in FIG. 8.

The method of FIG. 21 differs from the method of FIG. 8, however, in that the method of FIG. 21 includes executing (2104), by the VMMs of the tree topology, a reduce operation. In the method of FIG. 21, executing (2104) the reduce operation includes: sending (2106), by the root VMM to each of other VMMs of the tree topology, a request for an instance of a particular VM. Each of the VMMs may execute any number of VMs and in many cases the VMs may be completely different—different provisioning of resources, different operating systems, different, applications or workloads, and the like. In some embodiments, however, many different VMMs may support execution of the same VM, with a different instance of that VM executed by each different VMM.

To that end, executing (2104) the reduce operation continues by pausing (2108), by each of the other VMMs, the requested instance of the particular VM and providing (2110), by each of the other VMMs to the root VMM in response to the root VMM's request, the requested instance of the particular VM. Pausing VMs is described above in greater detail. Providing (2110) the requested instance of the particular VM to the root VMM may be carried out in a variety of ways, some of which may depend on the implementation of the distributed computing environment in which the VMMs and VMs operate. In some embodiments, the distributed computing environment in which the example method of FIG. 21 is carried out may be implemented as a parallel computer. Such a parallel computer may include a plurality of compute nodes, with each of the compute nodes operating as one of the plurality of hosts and executing at least one of the VMMs. Each of the compute nodes may also include plurality of communications adapters, with each communications adapter configured to couple the compute node to other compute nodes for data communications and to one of a plurality of data communications networks. In some embodiments, the networks may include a multi-dimensional, point-to-point network and a global combining network. In such embodiments, providing (2110) the requested instance of the particular VM to the root VMM may be carried out through use of the point-to-point network, the global combining network, some combination of the two, with DMA access, through messaging, or any number of other ways as will occur to readers of skill in the art.

Executing (2104) the reduce operation then continues by identifying (2126), by the root VMM, differences among the requested instances of the particular VM. In the example of FIG. 21, identifying (2126) differences among the requested instances of the particular VM is carried out by performing (2128) a bitwise XOR (exclusive OR) operation amongst the instances of the particular VM. In some embodiments, each compute node in the logical tree topology may include an ALU (arithmetic logic unit) configured to execute such bitwise XOR operations without utilizing primary CPU resources of the compute node. A bitwise XOR takes two bit patterns, typically of equal length, and performs a logical exclusive OR operation on each pair of corresponding bits. The result in each position is 1 if only the first bit is 1 or only the second bit is 1, but will be 0 if both are 0 or both are 1. In this way, the bitwise XOR compares two bits and results in a 1 if the two bits are different and a 0 if the two bits are the same.

Executing (2104) the reduce operation may be carried out at various times. In the method of FIG. 21, for example, executing (2104) the reduce operation may include executing (2118) the reduce operation periodically at predefined intervals without user intervention; executing (2120) the reduce operation on-demand responsive to a user request; and executing (2122) the reduce operation, automatically without user intervention, in dependence upon an execution policy (2124) and responsive to an event specified in the execution policy.

Figure 22:
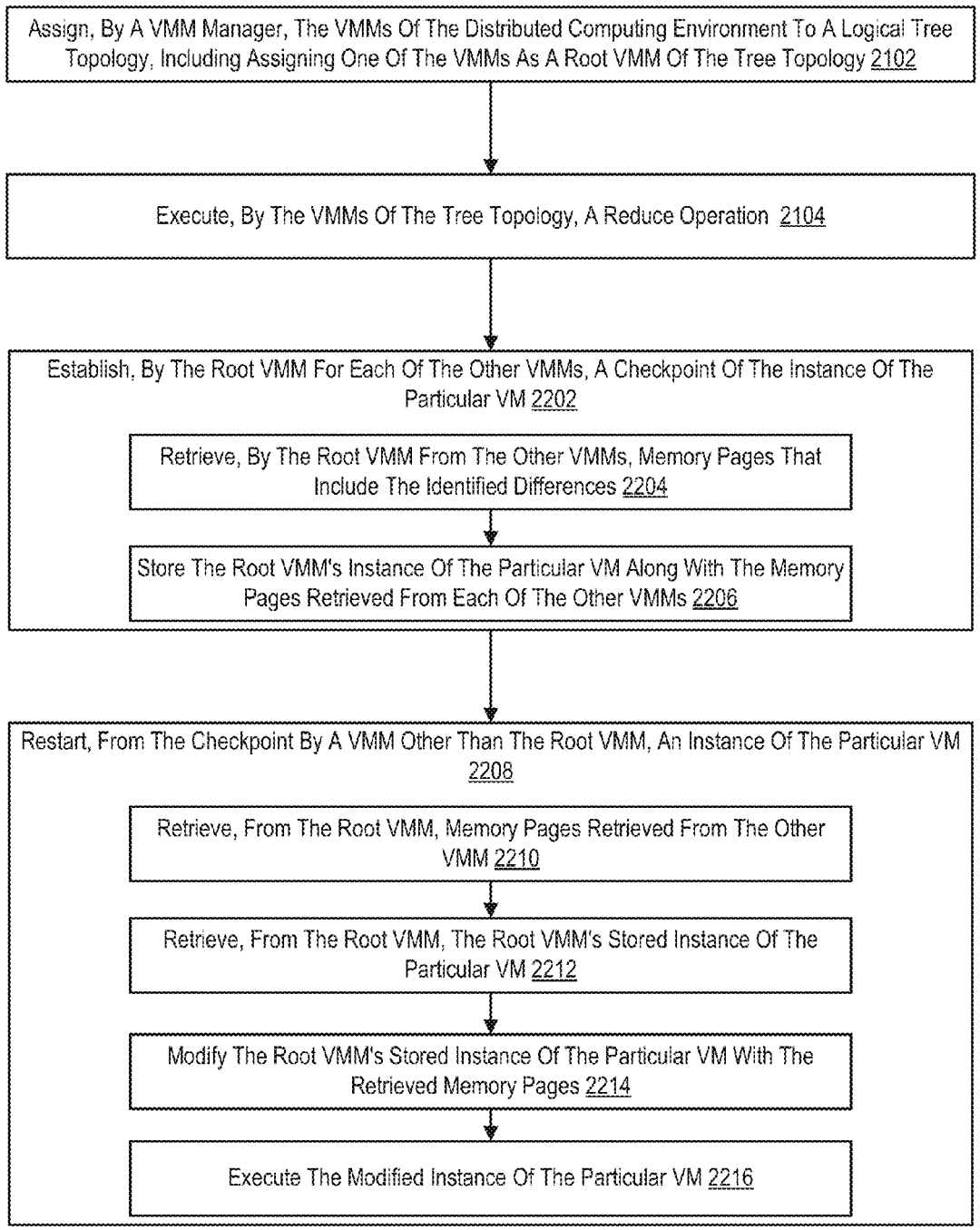
FIG. 22 sets forth a flow chart illustrating a further example method for administering VMs in a distributed computing environment utilizing a collective reduce operation according to embodiments of the present invention.

For further explanation, FIG. 22 sets forth a flow chart illustrating a further example method for administering VMs in a distributed computing environment utilizing a collective reduce operation according to embodiments of the present invention. The method of FIG. 22 is similar to the method of FIG. 21 in that the method of FIG. 22 includes assigning (2102) the VMMs to a logical tree topology and executing (2104) the reduce operation, including, among other elements of the execution, identifying differences among the requested instances of the particular VM by performing a bitwise XOR operation amongst the instances of the particular VM.

The method of FIG. 22 differs from the method of FIG. 21, however, in that the method of FIG. 22 includes establishing (2202), by the root VMM for each of the other VMMs, a checkpoint of the instance of the particular VM. Although two different instances of the same VM executing on two different hosts and supported by two different VMMs may execute differently (at different rates, with different outcomes, and so on), it is likely that a large portion of the data forming the two separate instances is identical. In a system with 100 VMMs, each executing a separate instance of a particular VM, storing 100 checkpoints for each instance may require a large amount of memory space. Instead, the method of FIG. 22, as described below in greater detail, provides a means by which checkpoints for many instances of the same VM may utilize memory space much more efficiently.

Establishing (2202) a checkpoint for each instance of the particular VM includes retrieving (2204), by the root VMM from the other VMMs, memory pages that include the differences identified through the bitwise XOR operation and storing (2206) the root VMM's instance of the particular VM along with the memory pages retrieved from each of the other VMMs. The root VMM's instance of the particular VM is stored in whole as a base image of the particular VM. Then, for each of the other instances, only memory pages that include differences from the base image are stored.

To that end, the method of FIG. 22 also includes restarting (2208), from the checkpoint by a VMM other than the root VMM, an instance of the particular VM. In the method of FIG. 22, restarting an instance of the particular VM from the checkpoint may be carried out by: retrieving (2210), from the root VMM, memory pages retrieved from the other VMM (those memory pages include differences from the base image); retrieving (2212), from the root VMM, the root VMM's stored instance of the particular VM (the base image); modifying the root VMM's stored instance of the particular VM with the retrieved memory pages; and executing (2216) the modified instance of the particular VM.

Figure 23:
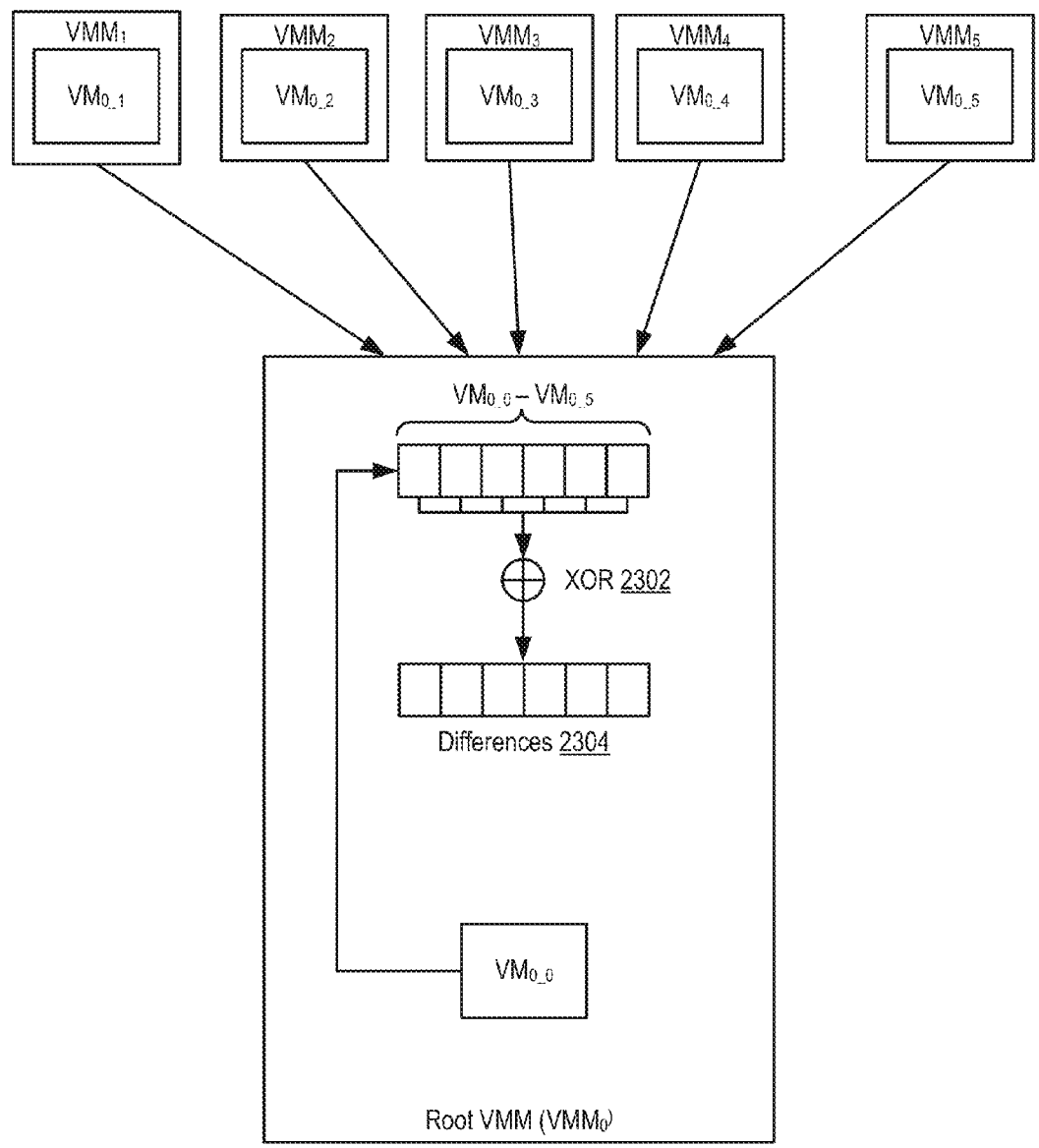
FIG. 23 sets forth a block diagram illustrating an example distributed computing environment in which VMs are administered utilizing a collective reduce operation according to embodiments of the present invention.

FIG. 23 sets forth a block diagram illustrating an example distributed computing environment in which VMs are administered utilizing a collective reduce operation according to embodiments of the present invention. The example environment of FIG. 23 includes six VMMs (VMM$_0$-VMM$_5$) which are assigned to a logical tree topology with one VMM (VMM$_0$) being assigned as a root and all other VMMs being assigned as a child of the root.

Each VMM in the example of FIG. 23 supports a separate instance of a particular VM (VM$_{0\_0}$-VM$_{0\_5}$). The VMMs in the example of FIG. 23 may execute a reduce operation by: sending, by the root VMM to each of other VMMs of the tree topology, a request for an instance of the particular VM (VM$_{0\_1}$-VM$_{0\_5}$); pausing, by each of the other VMMs (VMM$_1$-VMM$_5$), the requested instance of the particular VM; providing, by each of the other VMMs to the root VMM in response to the root VMM's request, the requested instance of the particular VM; and identifying, by the root VMM, differences (2304) among the requested instances of the particular VM. In the example of FIG. 23, each instance of the particular VM received from a non-root VMM is compared, via a bitwise XOR operation (2302), to the instance of the particular VM ($VM_{0\_0}$) supported by the root VMM ($VMM_0$). In this way, the differences (2304) may be stored along with a single copy of the root VMM's instance of the particular VM to effect a checkpoint of every different instance of the particular VM in the logical tree topology.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering a plurality of virtual machines ('VMs') in a distributed computing environment, the distributed computing environment comprising a plurality of hosts, one or more of the hosts executing a virtual machine monitor ('VMM'), each VMM supporting execution of one or more VMs, the method comprising:

assigning, by a VMM manager, the VMMs of the distributed computing environment to a logical tree topology, including assigning one of the VMMs as a root VMM of the tree topology;

executing, amongst the VMMs of the tree topology, a gather operation, including:
sending, by the root VMM, to other VMMs in the tree topology, a request to retrieve one or more VMs supported by the other VMMs, wherein the VMs requested to be retrieved are instances of an identical VM;
pausing, by the other VMMs, each VM requested to be retrieved; and
providing, by the other VMMs to the root VMM, the VMs requested to be retrieved and performing one of:
executing by the root VMM, upon receipt, the provided VMs and not resuming execution of the provided VMs by the other VMMs, and
storing by the root VMM, upon receipt of the provided VMs, the provided VMs without executing the provided VMs.

2. The method of claim 1, wherein executing the gather operation further comprises executing a gatherv operation and providing the VMs requested to be retrieved further comprises providing, by at least one of the other VMMs, a different number of VMs than another of the other VMMs.

3. The method of claim 1, further comprising:
after providing the VMs, not resuming execution of the provided VMs by the VMMs other than the root.

4. The method of claim 1, wherein executing the gather operation further comprises executing the gather operation periodically at predefined intervals without user intervention.

5. The method of claim 1, wherein executing the gather operation further comprises executing the gather operation on-demand responsive to a user request.

6. The method of claim 1, wherein executing the gather operation further comprises executing the gather operation, automatically without user intervention, in dependence upon an execution policy and responsive to an event specified in the execution policy.

7. The method of claim 1, wherein the distributed computing environment comprises a parallel computer, the parallel computer comprising a plurality of compute nodes, each of the compute nodes comprising one of the plurality of hosts and executing at least one of the VMMs, each compute node further comprising a plurality of communications adapters, each communications adapter configured to couple the compute node to other compute nodes for data communications and to one of a plurality of data communications networks.

8. The method of claim 7, wherein one of the plurality of data communications networks comprises a multi-dimensional, point-to-point network.

9. The method of claim 7, wherein one of the plurality of data communications networks comprises a global combining network.

* * * * *